(12) United States Patent
Kestle et al.

(10) Patent No.: US 9,248,593 B2
(45) Date of Patent: Feb. 2, 2016

(54) INJECTION UNIT POSITIONING APPARATUS

(71) Applicant: Mold-Masters (2007) Limited, Georgetown, ON (CA)

(72) Inventors: Martin Kestle, Everett (CA); John Di Simone, Woodbridge (CA); David Allan Shantz, Milton (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 0 days.

(21) Appl. No.: 14/435,753

(22) PCT Filed: Oct. 15, 2013

(86) PCT No.: PCT/CA2013/000892
§ 371 (c)(1),
(2) Date: Apr. 15, 2015

(87) PCT Pub. No.: WO2014/059528
PCT Pub. Date: Apr. 24, 2014

(65) Prior Publication Data
US 2015/0283744 A1    Oct. 8, 2015

Related U.S. Application Data

(60) Provisional application No. 61/714,177, filed on Oct. 15, 2012.

(51) Int. Cl.
*B29C 45/33*     (2006.01)
*B29C 45/17*     (2006.01)
*B29C 45/50*     (2006.01)

(52) U.S. Cl.
CPC ......... *B29C 45/1761* (2013.01); *B29C 45/5008* (2013.01)

(58) Field of Classification Search
CPC .................................................. B29C 45/5008
USPC ................................................... 425/574, 576
See application file for complete search history.

(56) References Cited

U.S. PATENT DOCUMENTS

| | | |
|---|---|---|
| 3,086,244 A | 4/1963 | Hehl |
| 3,205,536 A * | 9/1965 | Funck ................... B29C 45/076 425/574 |
| 3,335,464 A | 8/1967 | Schwartz |
| 3,464,091 A * | 9/1969 | Bielfeldt ............. B29C 45/0408 425/574 |
| 3,564,658 A | 2/1971 | Hehl |

(Continued)

FOREIGN PATENT DOCUMENTS

| | | |
|---|---|---|
| DE | 1852612 | 5/1962 |
| DE | 1753852 | 4/1975 |

(Continued)

*Primary Examiner* — Tim Heitbrink
(74) *Attorney, Agent, or Firm* — Medler Ferro PLLC

(57) ABSTRACT

An injection unit positioning apparatus is disclosed that includes a positioning assembly interconnecting the injection unit to the molding machine. The positioning assembly includes an angular positioning assembly that permits rotation of the injection unit through a sweep plane that extends from an axis that is perpendicular to an inlet surface of a mold. The positioning assembly also includes a linear positioning assembly that permits linear translation of the injection unit on the sweep plane, and the height of the outlet relative to the inlet surface remains substantially constant during rotation and translation of the positioning assembly.

24 Claims, 28 Drawing Sheets

(56) References Cited

U.S. PATENT DOCUMENTS

| | | |
|---|---|---|
| 3,761,214 A | 9/1973 | Hehl |
| 3,909,173 A | 9/1975 | Latter |
| 4,753,589 A | 6/1988 | Hehl |
| 4,863,368 A | 9/1989 | Hehl |
| 5,183,621 A | 2/1993 | Yukihiro et al. |
| 5,388,983 A | 2/1995 | Hehl |
| 5,443,378 A | 8/1995 | Jaroschek |
| 5,643,620 A * | 7/1997 | Brun, Jr. ............... B29C 45/125 425/574 |
| 6,352,427 B1 | 3/2002 | Hahn et al. |
| 6,447,282 B1 | 9/2002 | Miyauchi |
| 6,450,794 B1 | 9/2002 | Orru' |
| 6,468,458 B1 * | 10/2002 | Anderson ........... B29C 45/0013 425/576 |
| 6,572,362 B2 | 6/2003 | Boyd |
| 6,994,810 B2 | 2/2006 | Hahn et al. |
| 7,393,199 B2 | 7/2008 | Hahn et al. |
| 7,484,948 B2 | 2/2009 | Wimberger |
| 7,833,008 B2 | 11/2010 | Wimberger |
| 2007/0087080 A1 | 4/2007 | Weinmann |
| 2011/0151048 A1 | 6/2011 | Schad et al. |

FOREIGN PATENT DOCUMENTS

| | | |
|---|---|---|
| EP | 794046 | 9/1997 |
| EP | 1340607 | 5/2005 |
| GB | 1316741 | 5/1973 |
| GB | 1507102 | 4/1978 |
| JP | H07227875 | 8/1995 |
| WO | 2005007381 | 1/2005 |

* cited by examiner

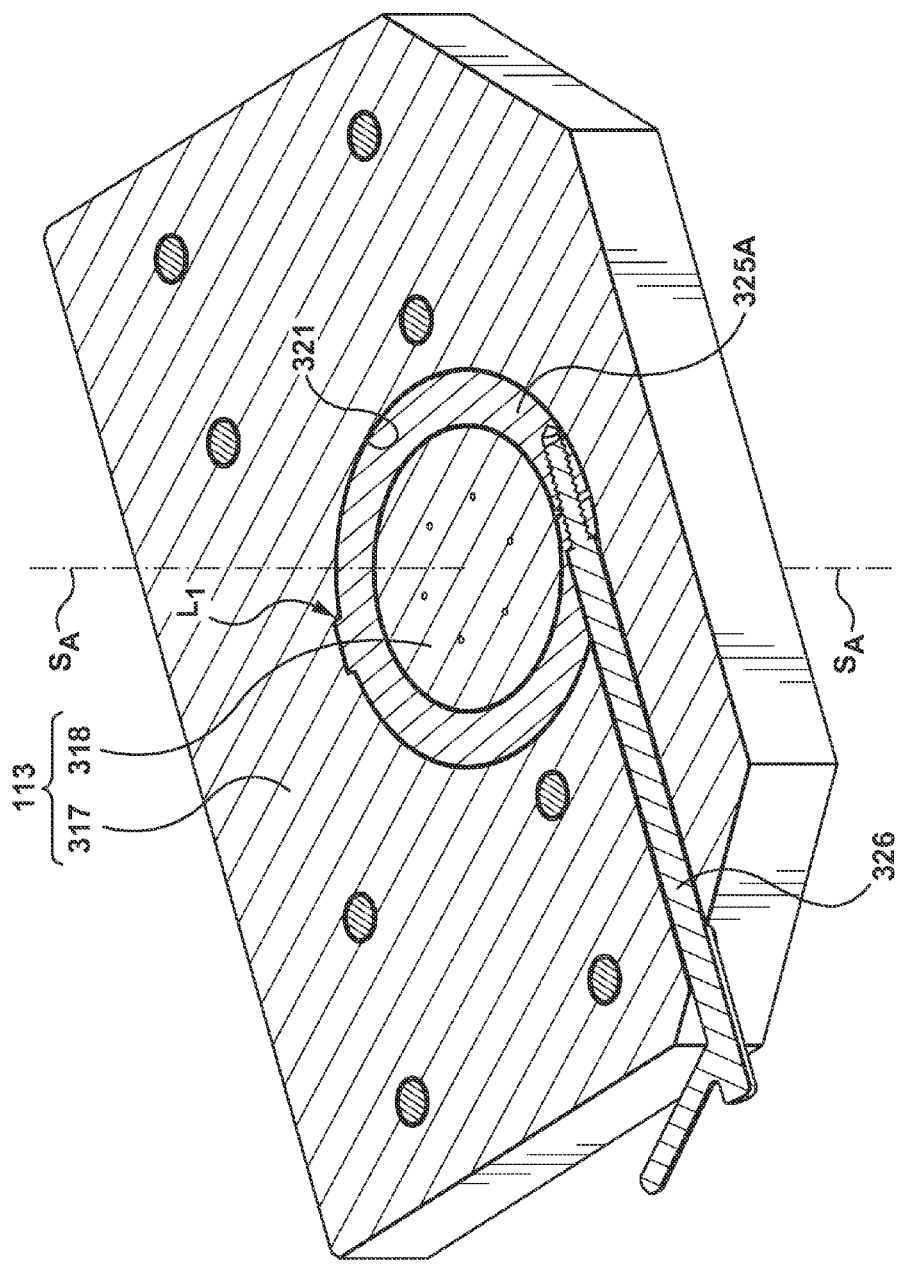

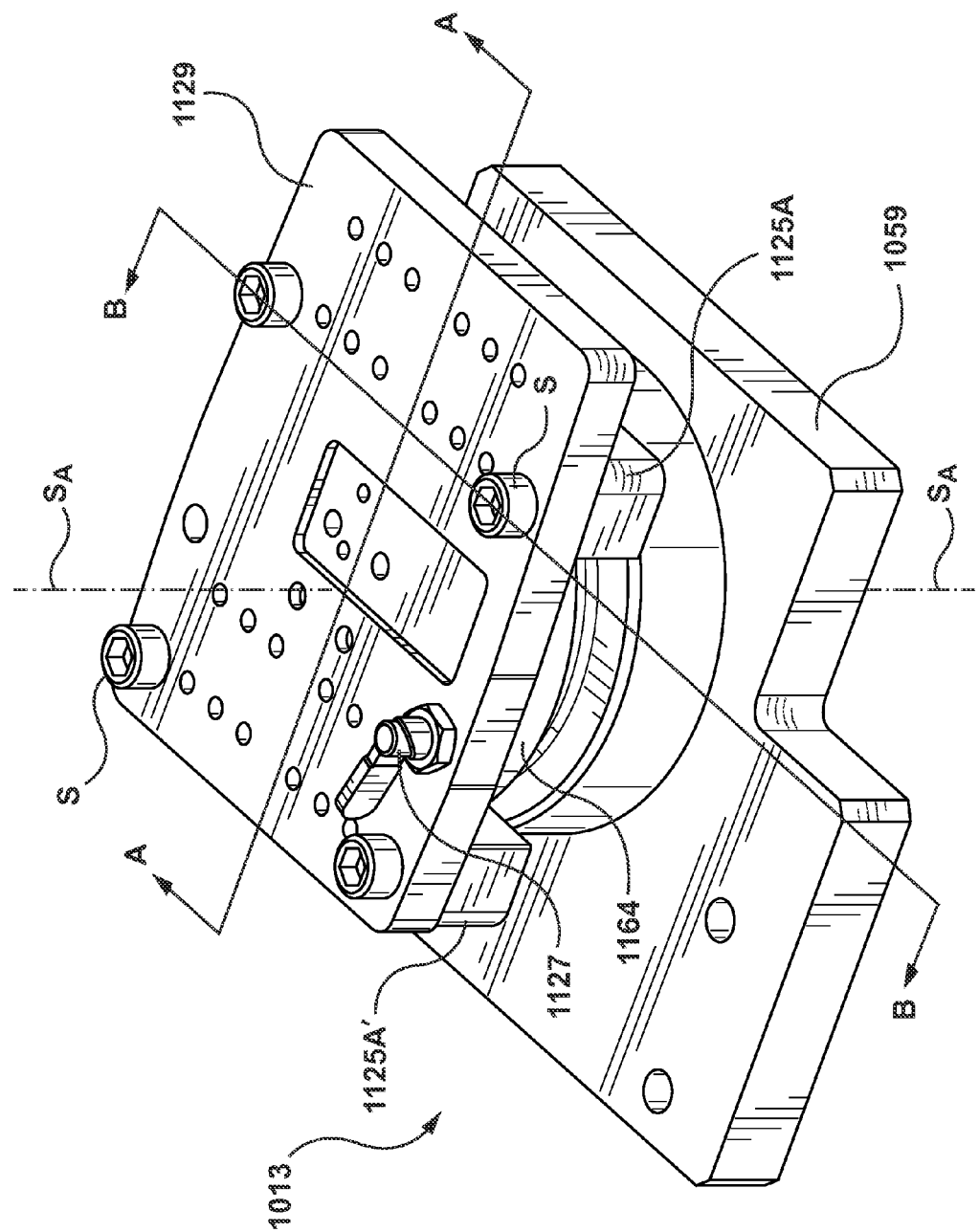

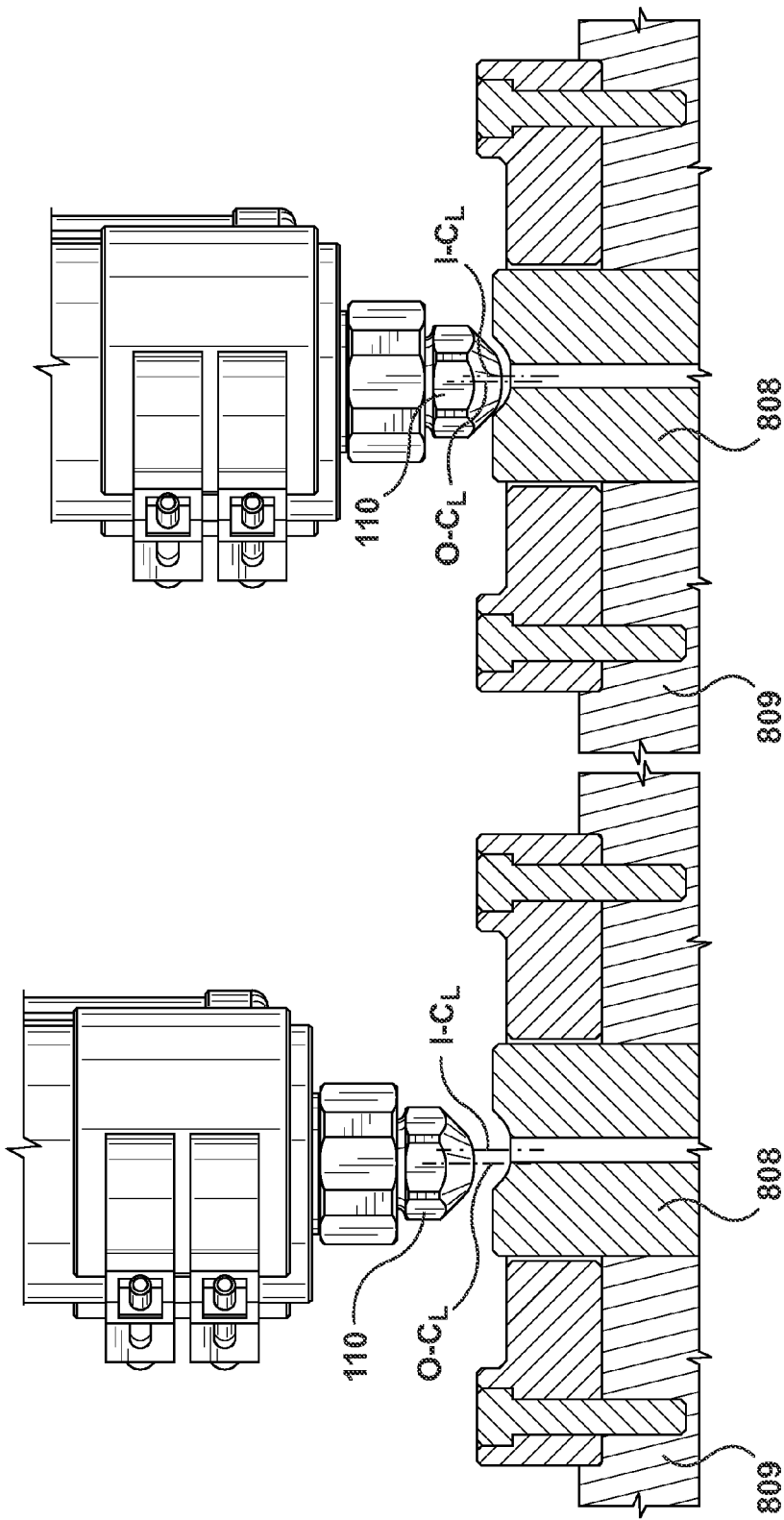

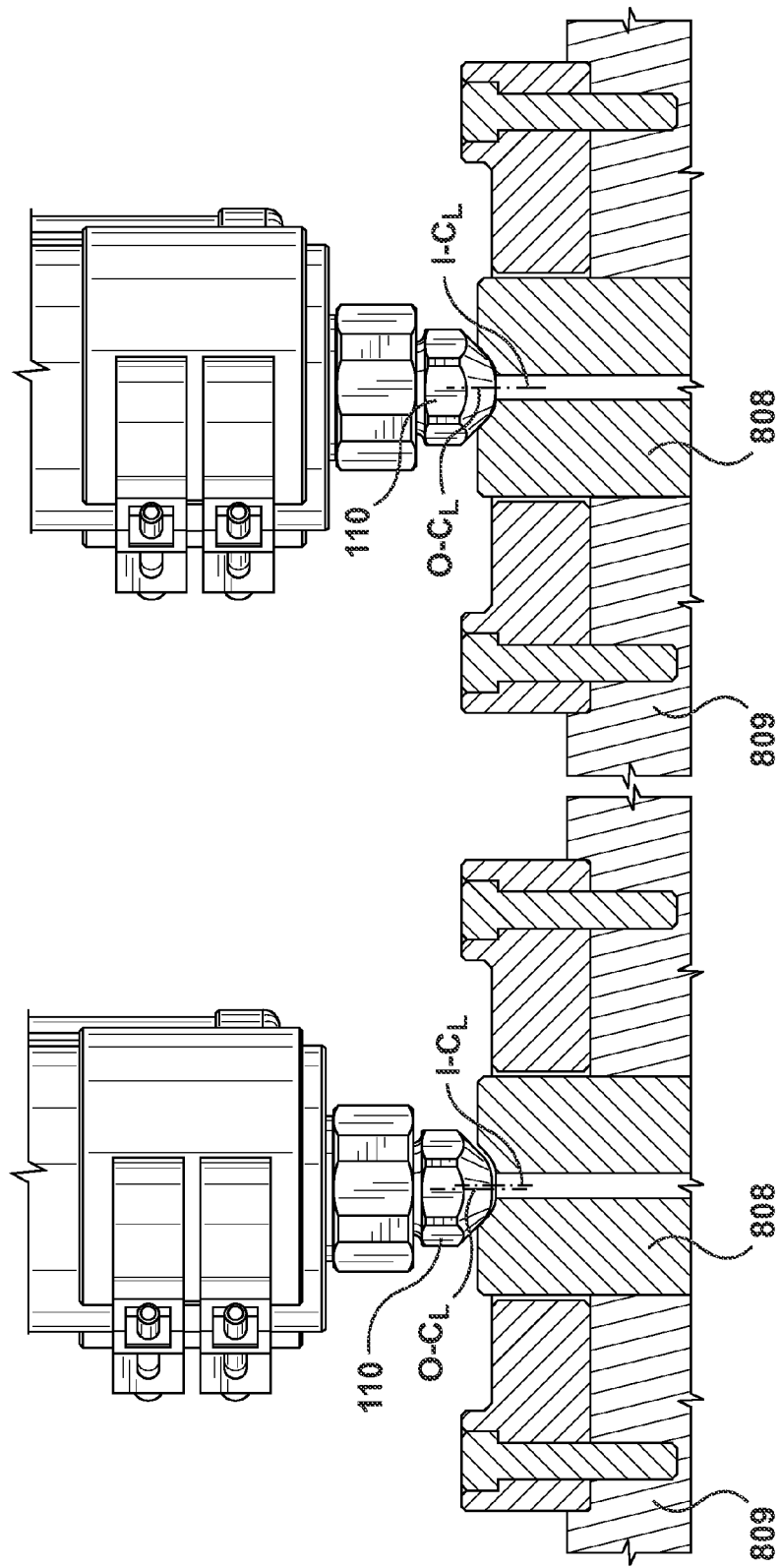

INJECTION UNIT POSITIONING APPARATUS

FIELD OF THE INVENTION

The invention relates generally to injection molding machines and more particularly to positioning apparatus for aligning an outlet of an injection unit with an inlet of a mold.

BACKGROUND OF THE INVENTION

Multi-material and/or multi-color injection molding applications typically require an injection molding machine that has two or more injection units for delivering the two or more materials and/or colors to an injection mold.

Auxiliary injection units have been developed that may be used with injection molding machines having a single injection unit in order to provide a means for processing the additional material and/or color required for multi-material and/or multi-color injection molding applications. Such auxiliary injection units may be attached to the injection molding machine and/or the injection mold such that an extruder nozzle of the auxiliary injection unit, or more particularly an outlet thereof, interfaces with a second material inlet component of the injection molding system. In many cases the injection mold must be engineered such that the second material inlet is positioned to interface with the injection unit outlet at a predetermined fixed location relative to the machine regardless of the ideal second material inlet position on the mold. As mentioned above, the auxiliary injection unit is attached to either the molding machine or the mold itself; in either case access to the mold set up area is limited, and often it is necessary to remove the auxiliary injection unit from the mold or the machine altogether to facilitate mold maintenance or change-over thus reducing the production efficiency of the molding cell.

SUMMARY OF EMBODIMENTS OF THE INVENTION

Embodiments hereof are directed towards an injection unit positioning apparatus for aligning an outlet of an injection unit with an inlet of a mold that is mounted between the platens of a molding machine. The injection unit positioning apparatus includes a positioning assembly interconnecting the injection unit and the molding machine. The positioning assembly includes an angular positioning assembly that permits rotation of the injection unit through a sweep plane that extends from a sweep axis that is perpendicular to an inlet surface of the mold. The positioning assembly also includes a linear positioning assembly that permits translation of the injection unit on the sweep plane, and the height of the outlet relative to the inlet surface remains substantially constant during rotation and translation of the positioning assembly.

In another embodiment hereof the injection unit positioning apparatus further includes an elevation assembly that permits adjusting the elevation of the injection unit relative to the inlet surface of the mold.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 3B is a perspective sectional view of the injection unit positioning apparatus angular positioning assembly taken through line B-B of FIG. 2B.

FIG. 11 is a side perspective view of an angular positioning assembly and a fixed linear part of the injection unit positioning apparatus.

FIGS. 14A to 14D are sequential views of an enlarged portion X of FIG. 14 depicting injection unit outlet being brought from approximate alignment with the inlet into precise alignment with the inlet.

DETAILED DESCRIPTION OF EMBODIMENTS OF THE INVENTION

Specific embodiments are now described with reference to the figures. The following detailed description is merely exemplary in nature and is not intended to limit the invention or the application and uses of the invention. In the following description, "downstream" is used with reference to the direction of mold material flow from an injection unit to a mold cavity of an injection molding system, and also to the order of components or features thereof through which the mold material flows from an injection unit to a mold cavity, whereas "upstream" is used with reference to the opposite direction. "Top", "bottom", "upper", "lower", and "side" are given their customary meaning and are used with reference to a position of the injection molding system when properly installed in an injection molding machine and viewed from the operator side and with reference to the orientation of the figures as shown on their respective pages.

Furthermore, there is no intention to be bound by any expressed or implied theory presented in the preceding technical field, background, brief summary or the following detailed description.

Figure 1A:
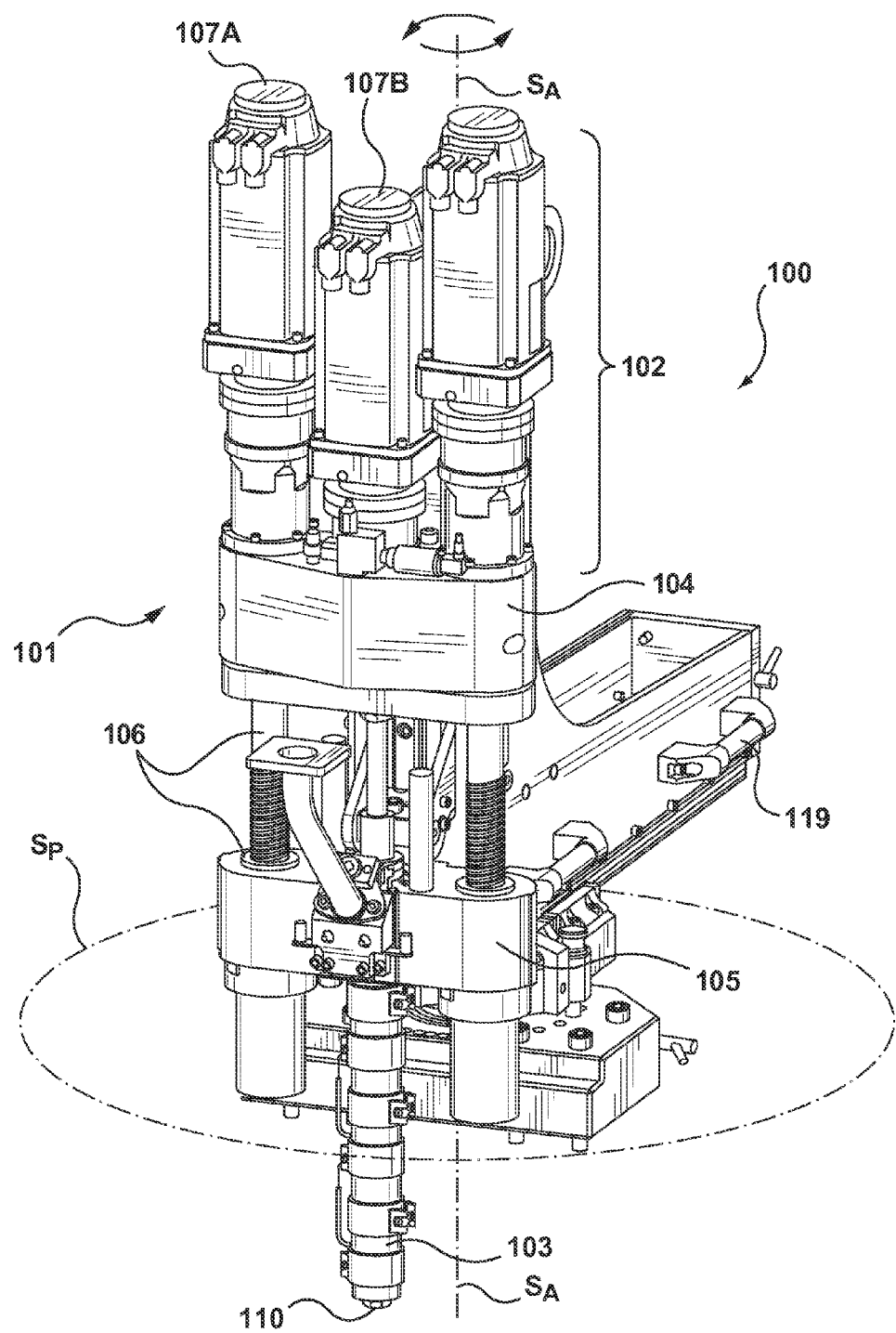
FIG. 1A is a front perspective view of an injection unit positioning apparatus having an injection unit coupled thereto in accordance with an embodiment hereof.
Figure 1B:
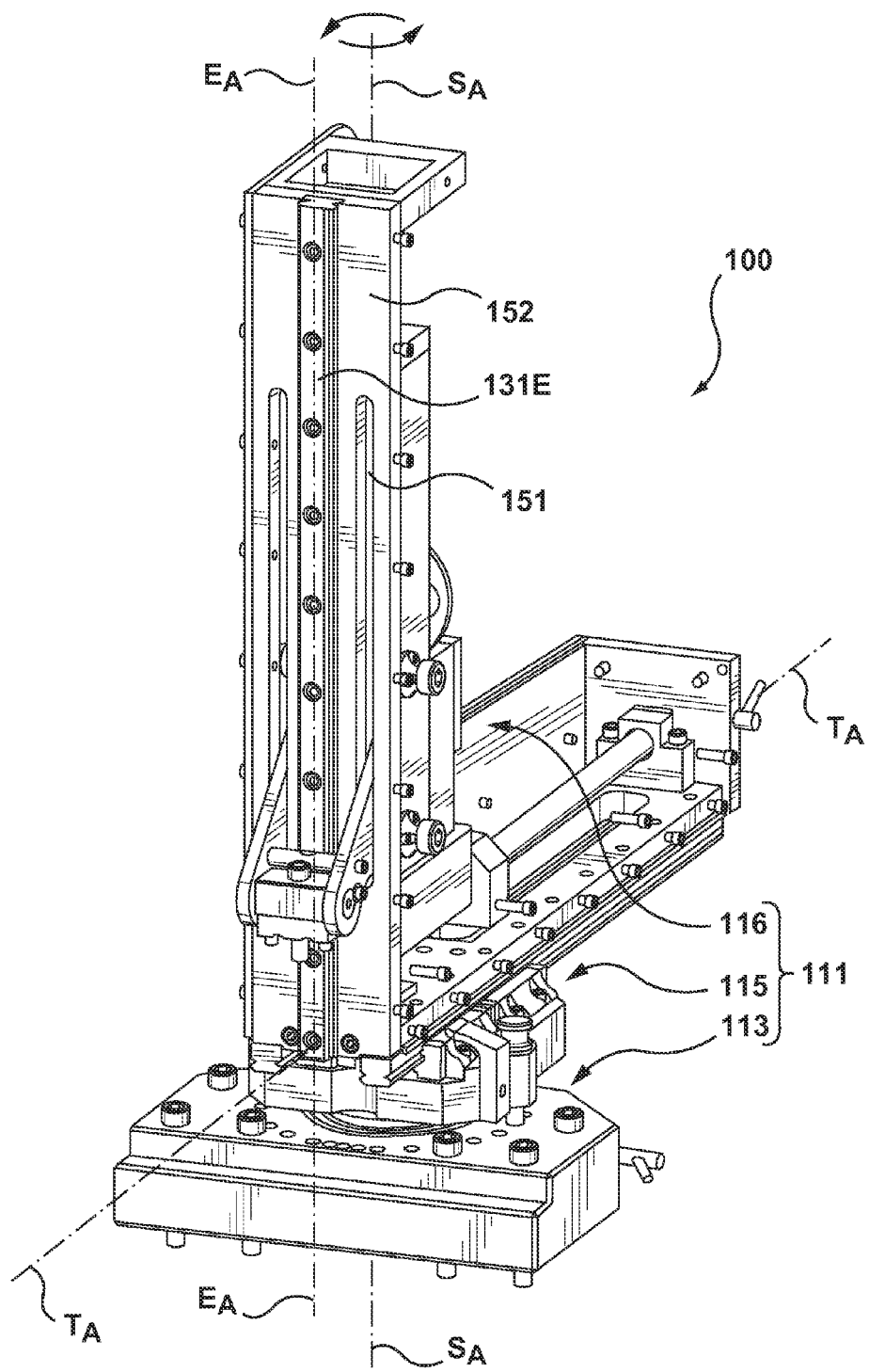
FIG. 1B is a front perspective view of the injection unit positioning apparatus of FIG. 1 with the injection unit removed and partially disassembled.
Figure 1C:
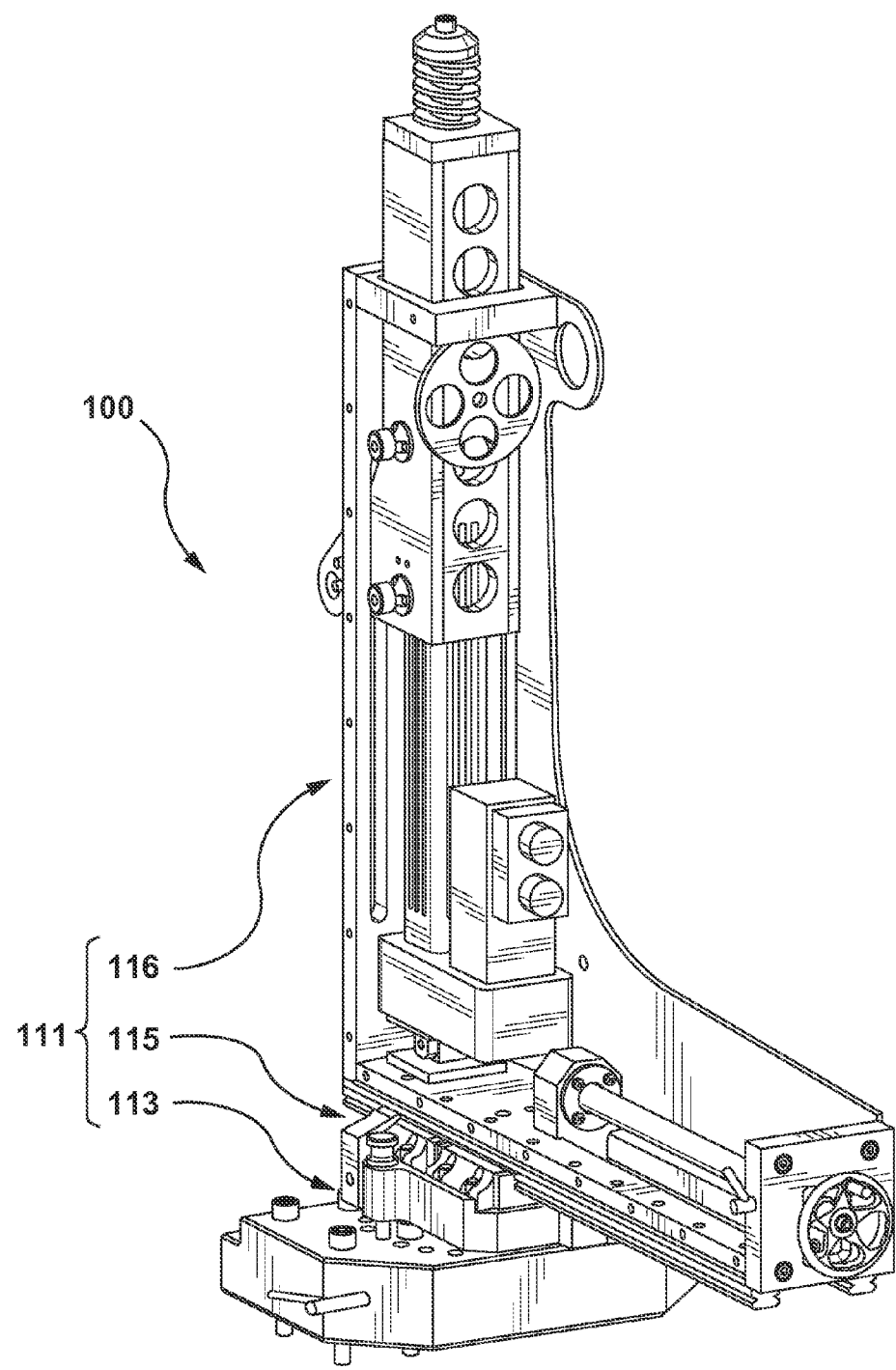
FIG. 1C is a rear perspective view of the injection unit positioning apparatus of FIG. 2 in which the elevation assembly is in an extended configuration.

FIG. 1A is a front perspective view of an injection unit positioning apparatus 100 in accordance with an embodiment hereof having an injection unit 101 coupled thereto, FIG. 1B is a front perspective view of injection unit positioning apparatus 100 of FIG. 1A partially disassembled and with injection unit 101 removed, and FIG. 1C is a rear perspective view of the injection unit positioning apparatus of FIG. 1A. Features and aspects of the current embodiment may be used accordingly with the other embodiments.

Injection unit 100 includes a drive assembly 102 for providing linear and rotary operation to an extruder screw which is rotatably and slidably disposed within an extruder barrel 103. Injection unit 101 further includes an injection housing 104 and a barrel housing 105, coupled together by a linear drive mechanism 106, such as a pair of ball screws extending through injection housing 104 and rotatably coupled to respective ball nuts located in barrel housing 105. A motor, such as servo motor 107A, is coupled to each ball screw for rotation thereof. Rotation of ball screws relative to ball nuts translates rotary motion of servo motor 107A into linear motion of ball screws, injection housing 104, and subsequently the extruder screw coupled thereto relative to extruder barrel 103 and barrel housing 105 during the injection phase of the molding cycle.

Drive assembly 102 includes another motor, such as servo motor 107B, coupled to the extruder screw for rotating the extruder screw to plasticize molding material between the extruder screw and extruder barrel 103. The extruder screw is coupled between injection housing 104 and drive assembly 102 via a quill which permits rotation and translation movement of the extruder screw during the injection cycle.

During operation, raw polymeric pellets from an external hopper (not shown) are introduced into extruder barrel 103 via an entry chute at an upstream end of extruder barrel 103 while the extruder screw is rotated and translated upward within extruder barrel 103, which moves the pellets downstream within a bore in extruder barrel 103, and melts the pellets into a melt stream of moldable material by a combination of heat applied to extruder barrel 103 by band heaters and kneading of the polymeric pellets caused by rotation of the extruder screw.

Figure 8:
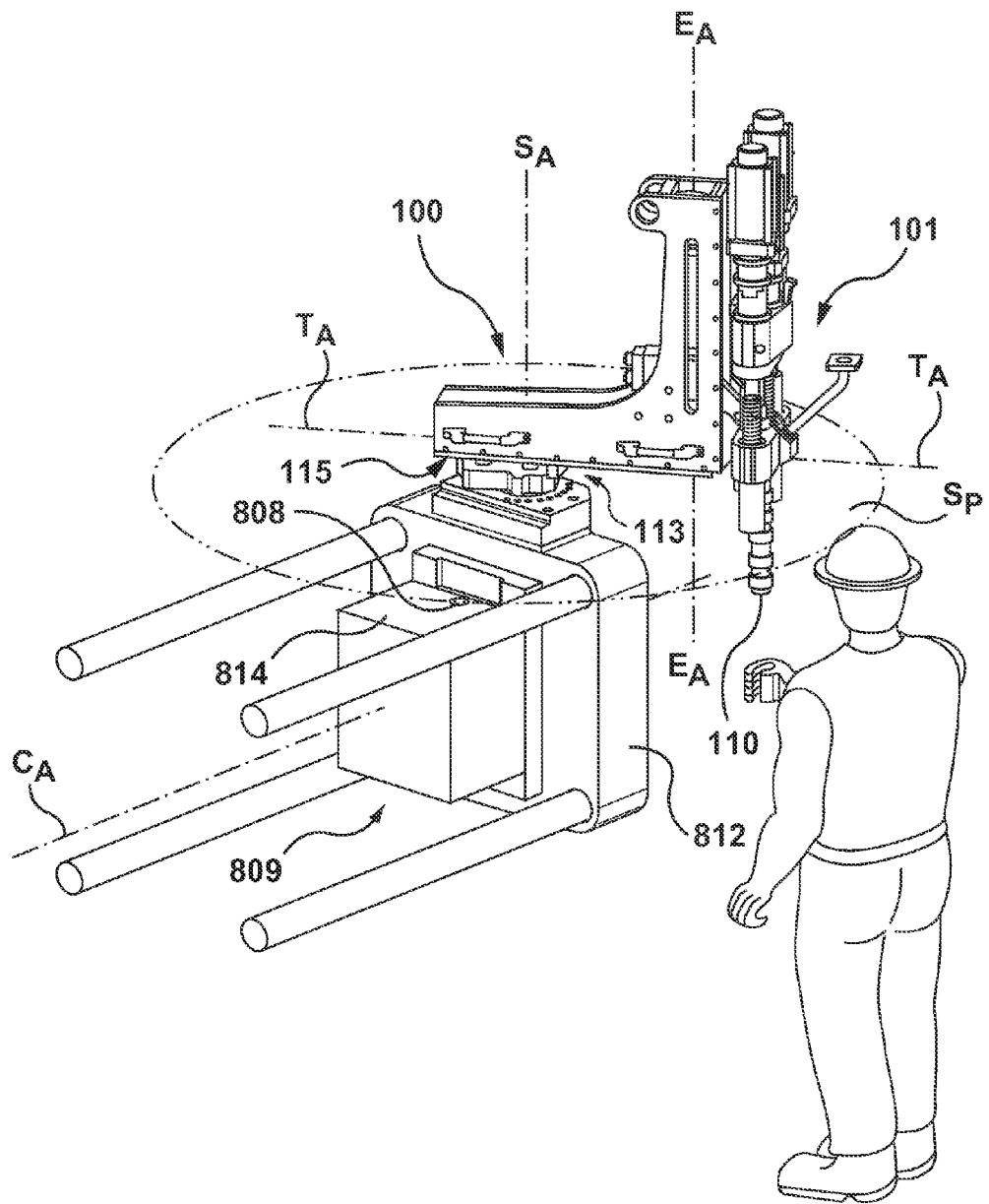
FIG. 8 is a front perspective view of the molding cell of FIG. 7 in which the injection unit positioning apparatus is positioned in a non-operational configuration.

When the required shot volume is reached, rotation of the extruder screw is halted, and it is translated in a downstream direction within extruder barrel 103 by drive assembly 102 to inject a shot of melt into an inlet of an injection mold, such as inlet 808 and mold 809 shown in FIG. 8, and ultimately into one or more mold cavities (not shown). The specific injection unit described herein is provided by way of example and not limitation. In an alternative embodiment the injection unit may be a hydraulic powered injection unit, and in a further embodiment the injection unit may be a so-called two stage injection unit.

Injection unit positioning apparatus 100 aligns an outlet 110 of injection unit 101 with inlet 808 of mold 809 that is mounted between the platens of a molding machine (Although not shown in FIGS. 1A and 1B, molding machines and platen arrangements thereof are known in the art of injection molding). Injection unit positioning apparatus 100 includes a positioning assembly 111 that interconnects injection unit 101 to the molding machine. As shown in FIG. 8 injection unit positioning apparatus 100 is coupled to a stationary platen 812 of a molding machine. Positioning assembly 111 includes a rotary assembly, or angular positioning assembly 113 that permits rotation of injection unit 101 in both directions about a sweep axis $S_A$ (as shown by arrows ↻ ) and through a sweep plane Sp that extends radially outward from sweep axis $S_A$. Sweep plane $S_P$ is generally defined as the plane through which outlet 110 passes when positioning assembly 111 is rotated about sweep axis $S_A$. Sweep axis $S_A$ is substantially perpendicular to an inlet surface of mold 809, such as inlet surface 814 shown in FIG. 8, and sweep plane $S_P$ is substantially parallel to inlet surface 814 of mold 809. As used herein "substantially perpendicular" is meant to mean "perpendicular" while taking into account normal deviations of up to three degrees from perpendicular, and "substantially parallel" is meant to mean "parallel" while taking into account normal deviations of up to three degrees from parallel; non-limiting examples of normal deviations include: manufacturing tolerances, wear on components, and flexing of components among others. Positioning assembly 111 also includes a linear displacement assembly, or linear positioning assembly 115 that permits linear, or radial translation of injection unit 101 along a translation axis $T_A$ that is substantially perpendicular to sweep axis $S_A$. In the current embodiment, positioning assembly 111 further includes an elevation assembly 116 that permits adjusting the elevation of injection unit 101, or more specifically, the elevation, or distance, of outlet 110 relative to inlet surface 814 of mold 809, along an elevation axis $E_A$. The height of sweep plane $S_P$ varies according to the elevation height of outlet 110. In the current embodiment elevation axis $E_A$ is substantially parallel to sweep axis $S_A$. Referring to FIG. 1B, elevation assembly 116 is in a retracted configuration such that outlet 110 would be positioned relatively closer inlet surface 814 of mold 809. In FIG. 1C, which is a rear perspective view of the injection unit positioning apparatus 100 of FIG. 1B, elevation assembly 116 is in an extended configuration such that outlet 110 would be relatively farther away from inlet surface 814 of mold 809.

In the current embodiment angular positioning assembly 113 is coupled to the molding machine (not shown), linear positioning assembly 115 is coupled to angular positioning assembly 113, and elevation assembly 116 is coupled to linear positioning assembly 115.

Figure 2A:
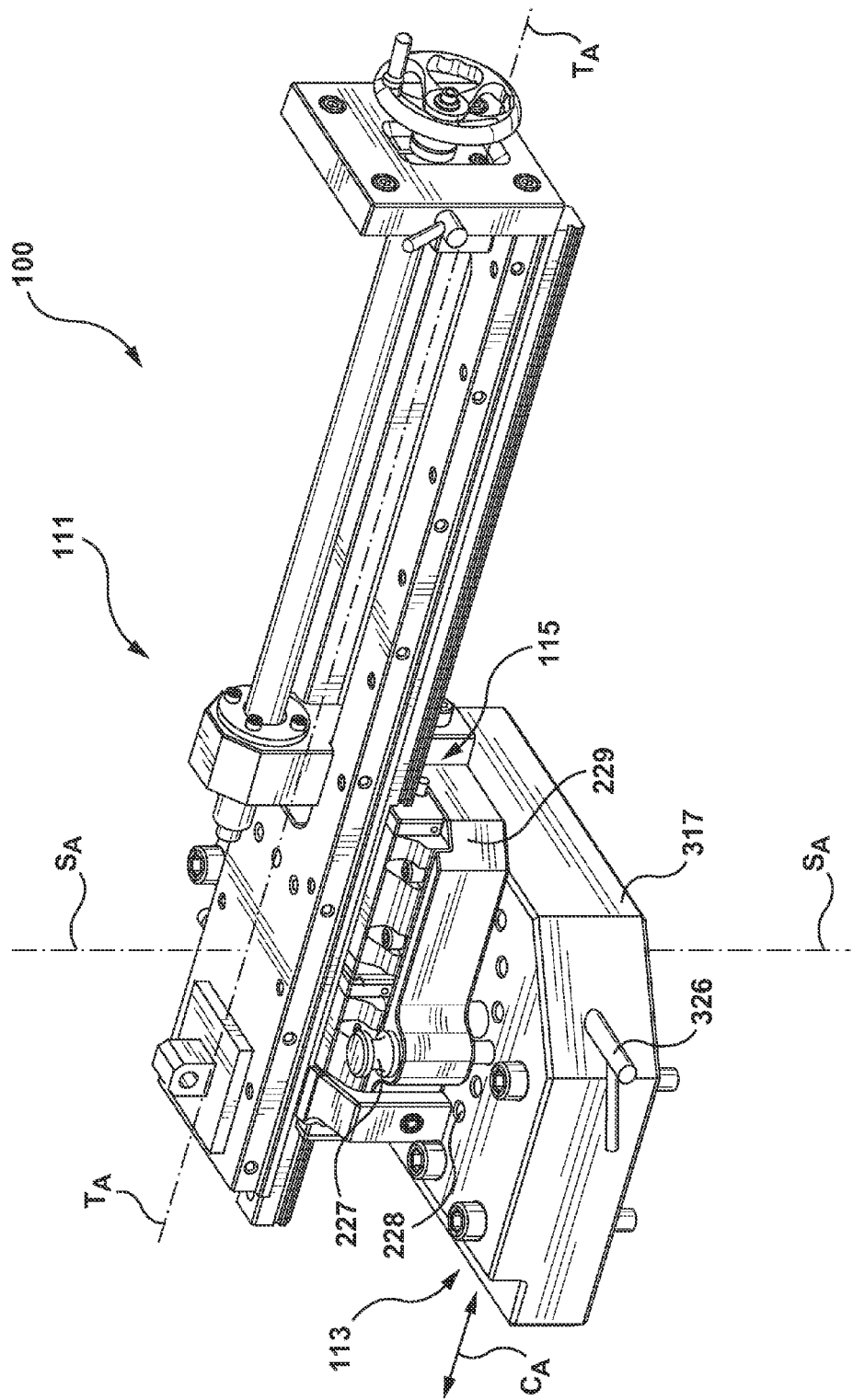
FIG. 2A is a side perspective view of a portion of injection unit positioning apparatus in which the linear positioning assembly is in a retracted configuration.
Figure 2B:
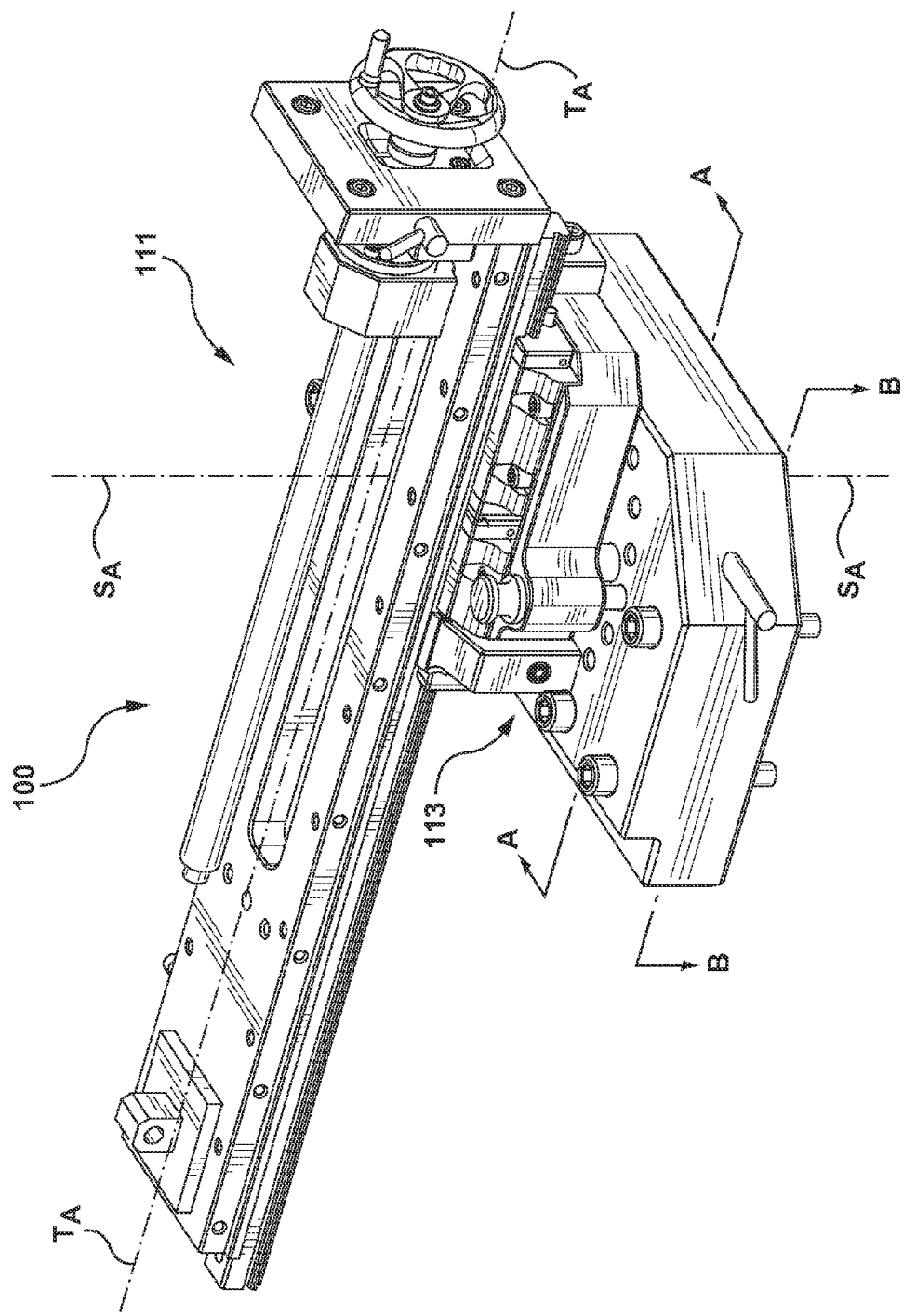
FIG. 2B is a side perspective view of the portion of the injection unit positioning assembly shown in FIG. 2A in which the linear positioning assembly is in an extended configuration.

FIG. 2A is a side perspective view of a portion of injection unit positioning apparatus 100 in which linear positioning assembly 115 is in a retracted configuration and FIG. 2B is a side perspective view of the portion of injection unit positioning apparatus 100 shown in FIG. 2A in which linear positioning assembly 115 is in an extended configuration.

Figure 3A:
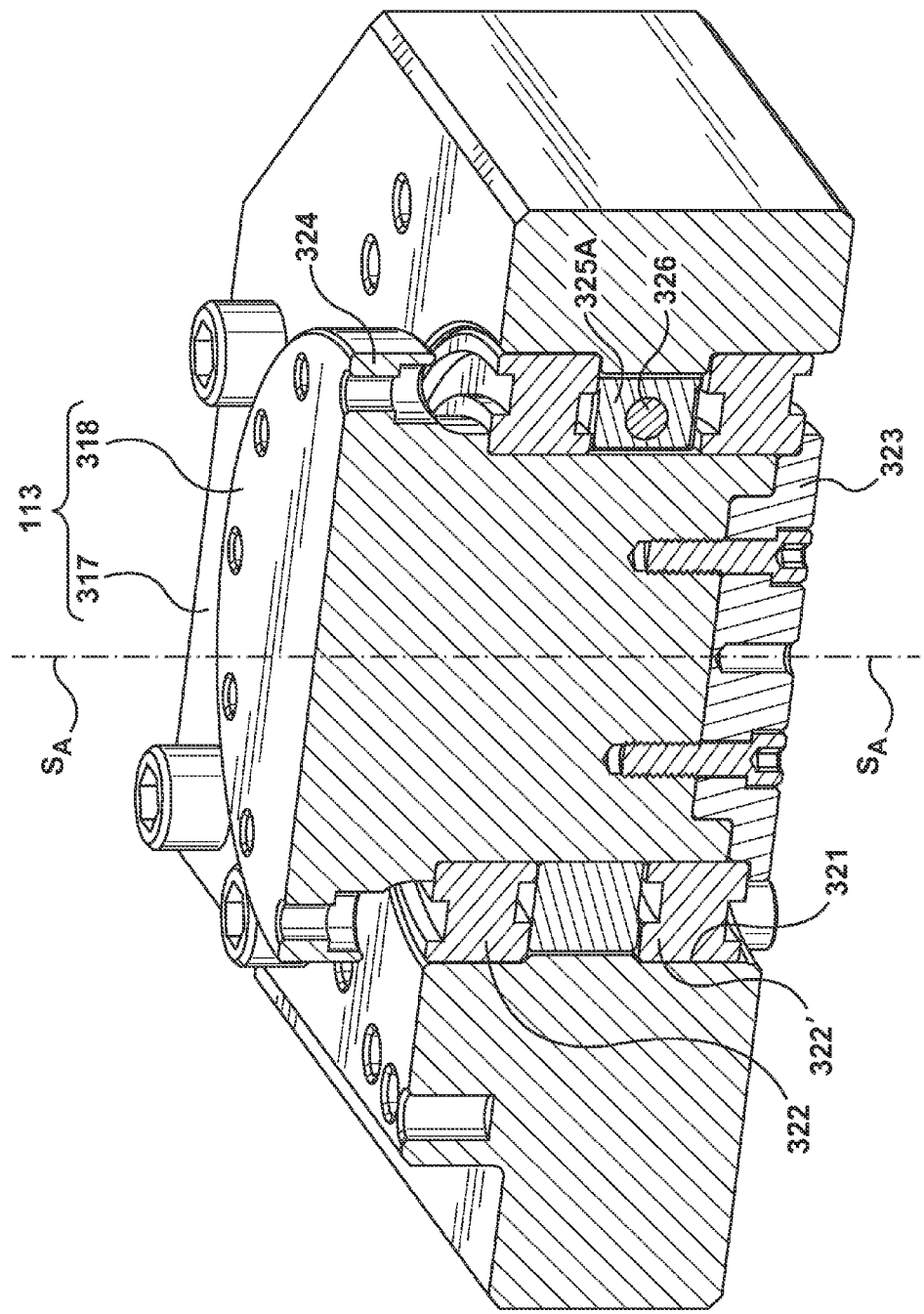
FIG. 3A is a perspective sectional view of the injection unit positioning apparatus angular positioning assembly taken through line A-A of FIG. 2B.

FIG. 3A is a perspective sectional view of angular positioning assembly 113 taken through line A-A of FIG. 2B and FIG. 3B is a perspective sectional view of angular positioning assembly 113 taken through line B-B of FIG. 2B. Angular positioning assembly 113 includes a fixed rotary part 317 and a movable rotary part 318.

Movable rotary part 318 is rotatable 360° about sweep axis $S_A$ relative to fixed rotary part 317. Rotation of movable rotary part 318 relative to fixed rotary part 317 is accomplished by an operator engaging a drive member, such as handle 119 shown in FIG. 1A, to push/pull injection unit positioning apparatus 100 into a desired sweep location, or angular position.

In the current embodiment movable rotary part 318 is a swivel pin rotatably coupled to fixed rotary part 317, and fixed rotary part 317 is a base plate coupled to the molding machine via fasteners, such as socket head cap screws. A bore 321 extends through fixed rotary part 317 in which movable rotary part 318 is rotatably disposed. A pair of bearings 322, 322' are provided in bore 321 to support movable rotary part 318 relative to fixed rotary part 317, and to allow for reduced friction therebetween when movable rotary part 318 is rotated relative to fixed rotary part 317. A retainer plate 323 is provided at an end, or bottom of movable rotary part 318 to prevent the lower bearing 322' from becoming dislodged from bore 321. A flange 324 extends radially outward from another end, or top of movable rotary part 318 to provide an enlarged surface for mating with linear positioning assembly 115.

In the current embodiment angular positioning assembly 113 further includes a friction clamp, such as angular friction clamp 325A, for allowing continuous angular positioning of movable rotary part 318 relative to fixed rotary part 317 and thus outlet 110 on sweep plane $S_P$. In the current embodiment angular friction clamp 325A is a split-ring disposed in bore 321 between bearings 322, 322'. Angular friction clamp 325A can be engaged to hold movable rotary part 318 in place relative to fixed rotary part 317 at any angular position around sweep axis $S_A$, and can be disengaged to allow of movable rotary part 318 to be rotated relative to fixed rotary part 317. An engagement lever 326 extends through fixed rotary part 317 and is operably coupled to angular friction clamp 325A to selectively engage and disengage angular friction clamp 325A with movable rotary part 318. Rotation of engagement lever in a first direction causes angular friction clamp 325A to grip movable rotary part 318, whereby angular friction clamp 335A is engaged, whereas rotation of engagement lever 326 in the opposite direction releases angular friction clamp 325A from gripping movable rotary part 318, whereby angular friction clamp 325A is disengaged. In the current embodiment an anti-rotation protrusion extends radially outward from angular friction clamp 325A to mate with a corresponding anti-rotation depression in fixed rotary part 317 as shown at location $L_1$ in FIG. 3B. When angular friction clamp 325A is engaged with movable rotary part 318, the combination of anti-rotation protrusion and anti-rotation depression reduces the likelihood of rotational force applied to movable rotary part 318 from also being applied to, and possibly even damaging, rotation brake engagement lever 326.

Referring to FIG. 2A, in an embodiment, positioning assembly 111 includes an index pin and at least one index hole, such as index pin 227 extending though fixed linear part 229 to engage with index hole 228 in fixed rotary part 317. Engagement between index pin 227 and index hole 228 allows angular positioning assembly 113 to be locked at a discrete angular position about sweep axis $S_A$. Non-limiting examples of discrete angular positions include evenly spaced increments of 15 degrees, substantially parallel to the molding machine clamping axis $C_A$, and substantially perpendicular to the molding machine clamping axis $C_A$.

Figure 4:
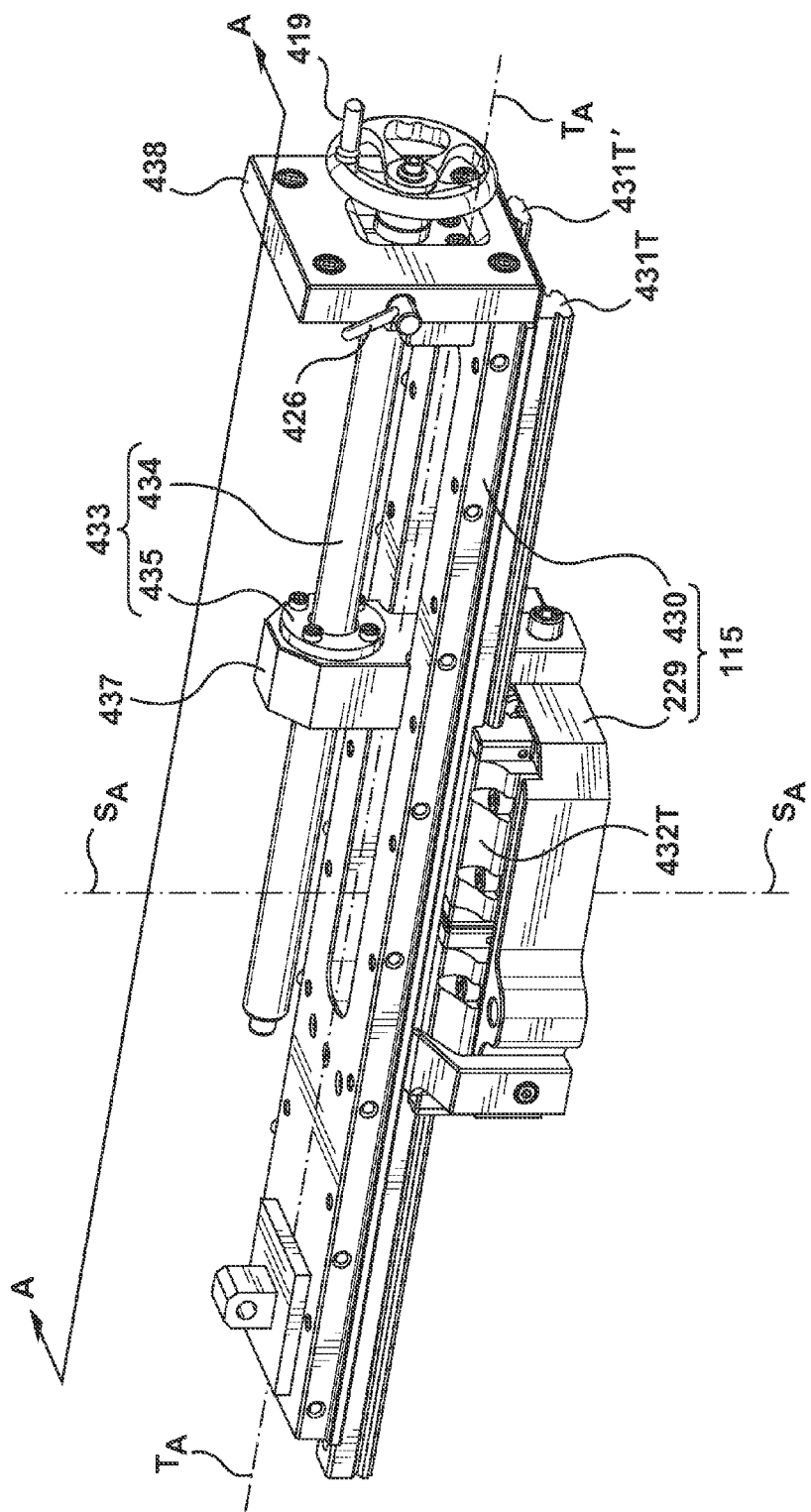
FIG. 4 is a perspective view of the injection unit positioning apparatus linear positioning assembly in an intermediate position.
Figure 4A:
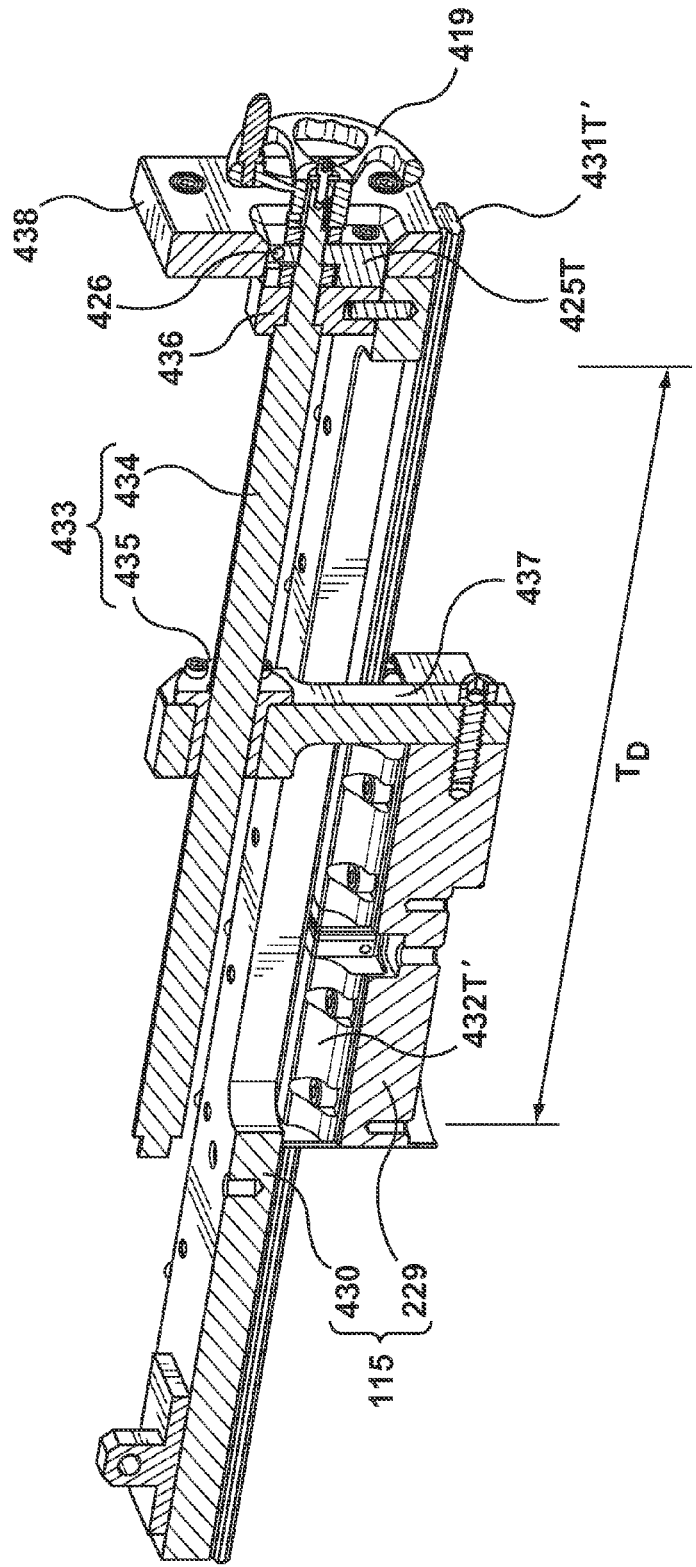
FIG. 4A is a perspective sectional view of the linear positioning assembly taken through FIG. line A-A of FIG. 4.

Turning now to FIG. 4 and to FIG. 4A in which FIG. 4 is a side perspective view of linear positioning assembly 115 in an intermediate position, and FIG. 4A is a perspective sectional view of linear positioning assembly 115 taken through line A-A of FIG. 4. Linear positioning assembly 115 includes fixed linear part 229 and a movable linear part 430, moveable linear part 430 is translatable relative to fixed linear part 229 along translation axis $T_A$. $T_A$ is substantially perpendicular to sweep axis $S_A$ such that the elevation or height of outlet 110 relative to mold inlet surface 814 remains constant when positioning assembly 111 is translated linearly along translation axis $T_A$. Movable linear part 229 is provided in the form of a translation rail plate that is slidably coupled to fixed linear part 430 and fixed linear part 430 is provided in the form of a swivel plate that is coupled to movable rotary part 229 via fasteners, such as socket head cap screws, extending between flange 324 and fixed linear part 229. In the current embodiment, fixed linear part 229 defines a pocket in which movable rotary part 318 is received. In an alternative embodiment, rather than being provided as a separate component, fixed linear part 229 is integral with movable rotary part 318.

Linear rails, such as translation linear rails 431T, 431T', are provided between fixed linear part 229 and movable linear part 430 to guide movement of movable translation part 430 relative to fixed translation part 229 and to allow for reduced friction therebetween. In the current embodiment translation linear rails 431T, 431T' are arranged such that a plurality of linear guide blocks, such as translation guide blocks 432T, 432T' are coupled to fixed linear part 430 receive respective translation linear rails 431T, 431T'. In embodiments herein, linear rails and linear guide blocks are provided between associated fixed and moving parts by way of example and not limitation. In an alternative embodiment (not shown) another type of low friction rolling or sliding element and a way, such as a caged ball and hardened way system is provided between associated fixed and moving parts.

In the current embodiment, translation of movable linear part 430 relative to fixed linear part 229 is accomplished by an adjustment assembly 433 in the form of a lead screw 434 and lead nut 435 arrangement. Lead screw 434 is coupled to movable linear part 430 and extends through a lead screw support 436 also coupled to movable linear part 430, and is freely rotatable therein by a drive member, such as handle 419. Lead screw 434 is threadably mated with lead nut 435 which is fixedly coupled to fixed linear part 229 via a tongue 437 extending upward from fixed linear part 229 through an opening in movable linear part 430, such that rotation of lead screw 434 relative to lead nut 435 translates movable linear part 430 relative to fixed linear part 220 along translation axis $T_A$.

In the current embodiment linear positioning assembly 115 further includes a friction clamp, such as translation friction clamp 425T, for allowing continuous linear positioning of movable linear part 430 relative to fixed linear part 229. In the current embodiment translation clamp 425T is a split-ring block that surrounds a portion of lead screw 434, and is sandwiched between lead screw support 436 and an end support 438 that is adjacent to handle 419. Translation friction clamp 425T can be disengaged to allow movable linear part 430 to be translated relative to fixed linear part 229 and can be engaged to prevent rotation of lead screw 434 and subsequently to hold movable linear part 430 in place relative to fixed linear part 229 at any linear position along translation axis $T_A$ within the available translation distance $T_D$ of linear positioning assembly 115. An engagement lever 426 extends through end support 438 and is operably coupled to translation friction clamp 425T for engaging and disengaging translation friction clamp 425T with lead screw 434. Translation Friction clamp 425T is keyed relative to end support 438 to prevent rotational force applied to lead screw 434 from being applied to, and possibly damaging, engagement lever 426 when translation friction clamp 425T is engaged with lead screw 434.

Figure 5:
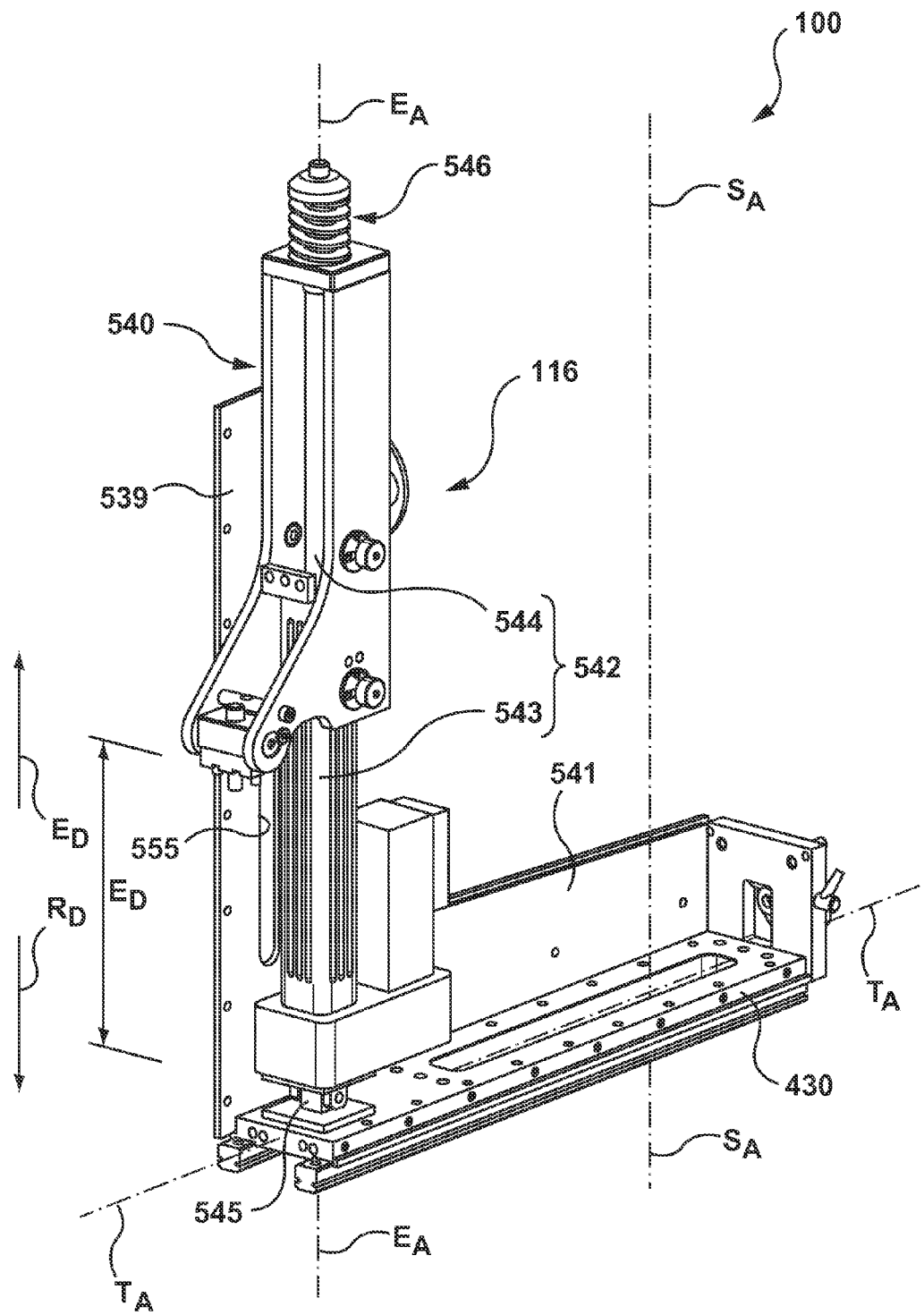
FIG. 5 is a front perspective view of a portion of the injection unit positioning assembly in which the elevation assembly is in an extended configuration.

Referring now to FIG. 5 which is a front perspective view of a portion of injection unit positioning apparatus 100 in which elevation assembly 116 is in an extended configuration. Elevation assembly 116 includes a fixed elevation part 539 and a movable elevation part 540. Movable elevation part 540 is translatable relative to fixed elevation part 539 along elevation axis $E_A$. Translation of movable elevation part 540 relative to fixed elevation part 539 adjusts the elevation height of injection unit 101 relative to inlet surface 814 of mold 809. In the current embodiment elevation axis $E_A$ is substantially parallel to sweep axis $S_A$ and is substantially perpendicular to translation axis $T_A$, however, in an alternative embodiment (not shown) elevation axis $E_A$ is at an angle relative to sweep axis $S_A$ and to sweep plane $S_P$ which allows injection unit 101 and outlet 110 to be in line with an inlet that is at an angle relative to the inlet surface of a mold; in either case, the elevation or height of outlet 110 relative to mold inlet surface 814 remains substantially constant when positioning assembly 111 is rotated about sweep axis $S_A$.

In the current embodiment movable elevation part 540 is a thrust frame assembly translatably coupled to fixed elevation part 539, and fixed elevation part 539 includes elevation rail plate 152 and a support frame 541 coupled to movable linear part 430 via fasteners, such as socket head cap screws. In an embodiment (not shown) fixed elevation part 539 and movable linear part 430 are a weldment or a casting. In another alternative embodiment (not shown) fixed elevation part 539 is integral with movable linear part 430. Movable elevation part 540 is coupled to fixed elevation part via a linear actuator 542, and is translatable relative to fixed elevation part 539 between an extended position (as shown in FIG. 5) and a retracted position (as shown in FIG. 1B), via actuation of linear actuator 542 coupled therebetween. Linear actuator 542 includes a housing 543 and a shaft 544 that is translatable relative to housing 543, housing 543 being coupled to fixed elevation part 539 via a clevis mount 545 coupled to movable linear part 430, and shaft 544 being coupled to movable elevation part 540 via a biased coupling 546. The arrangement of fixed elevation part 539, movable elevation part 540 and linear actuator 542 is such that the outlet 110 of injection unit 101 would engage with mold inlet 808 when movable elevation part 540 is translated in the retracted direction $R_D$ as shown by arrow ↓ in FIG. 5. In the current embodiment linear actuator 542 is a servo driven K-Series electric linear actuator available from Exlar Corporation of Chanhassen Minn., USA.

Figure 6A:
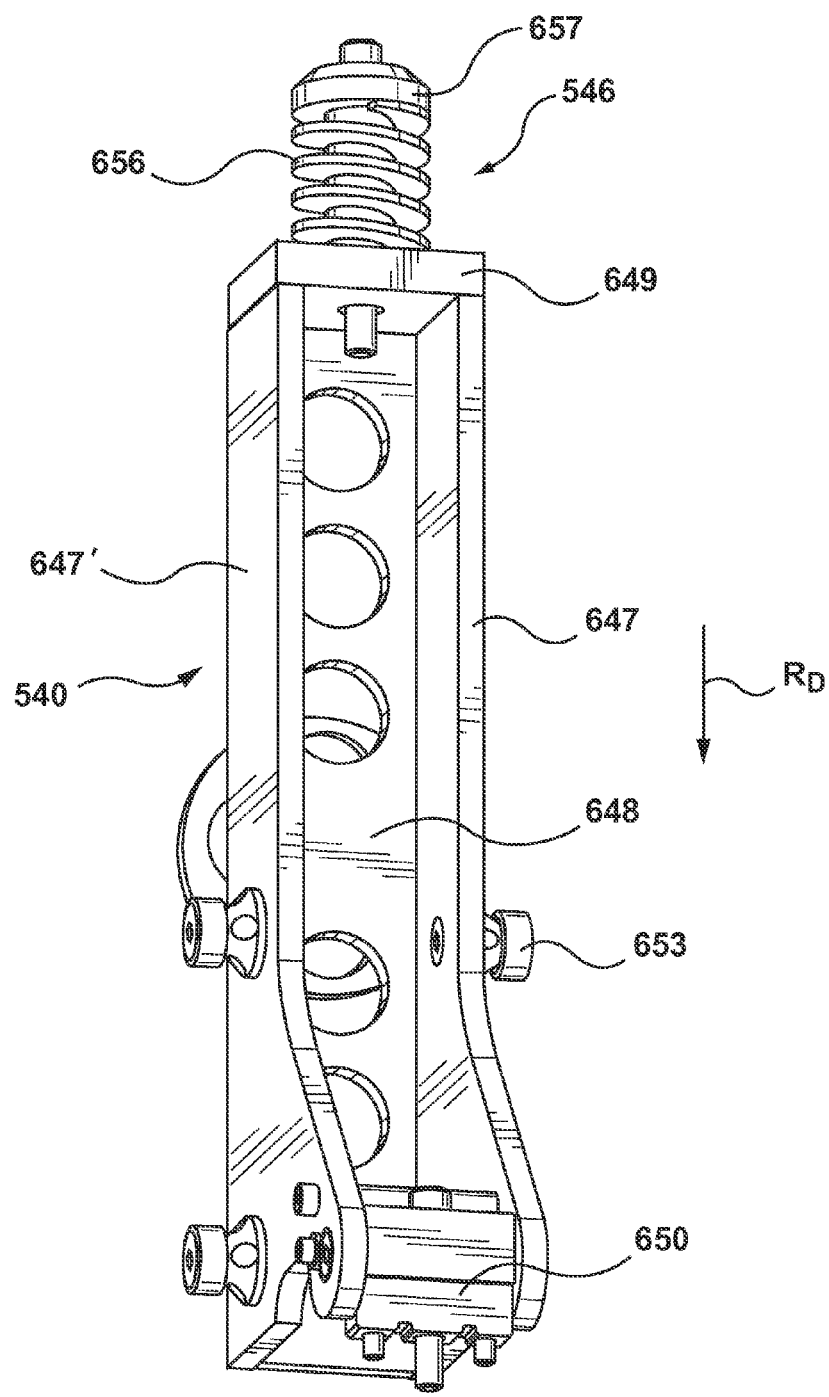
FIG. 6A is a front perspective view of the elevation assembly thrust frame.
Figure 6B:
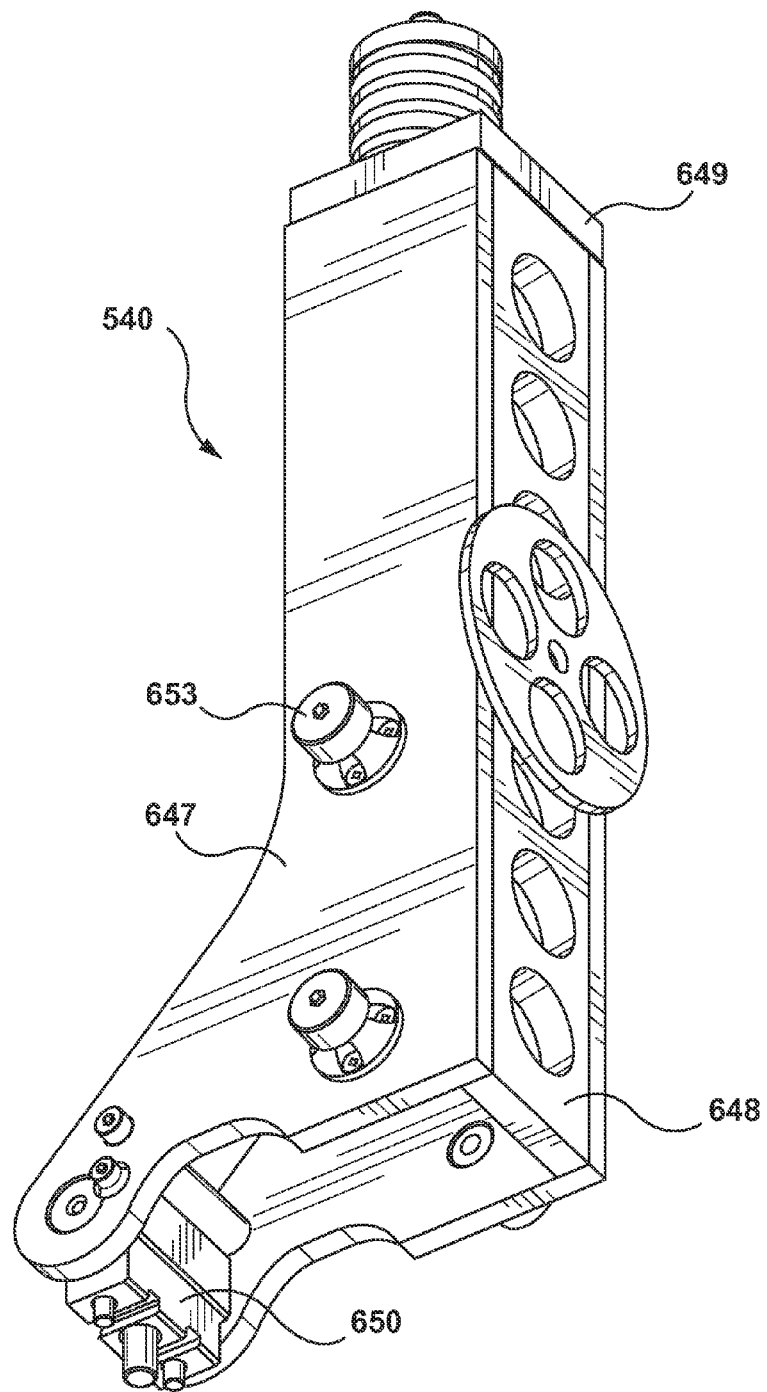
FIG. 6B is a rear perspective view of the elevation assembly thrust frame.

Referring to FIG. 1A, FIG. 1B, and also to FIG. 6A which is a front perspective view of movable elevation part 540, and FIG. 6B which is a rear perspective view of movable elevation part 540. Movable elevation part 540 includes a pair of thrust forks 647, 647' coupled to and spaced apart by a support plate 648, a bridge 649, and a mounting block 650. Thrust forks 647, 647' extend through respective openings 151 (as shown in FIG. 1B) in an elevation rail plate 152 (also shown in FIG. 1B) and are coupled to barrel housing 105 of injection unit 101 (as shown in FIG. 1A) via mounting block 650. A linear rail, such as elevation linear rail 131E is coupled to elevation rail plate 152. A pair of linear guide blocks, such as an upper elevation guide block and a lower elevation guide block, are slidably coupled to elevation linear rail 131E. (Upper and lower elevation guide blocks are not shown in the current embodiment but function similarly to upper and lower elevation guide blocks 1332E-U, 1332E-L discussed in the embodiment of FIG. 13.) Elevation linear rail 131E, and upper and lower elevation guide blocks maintain alignment between injection unit 101 and elevation axis $E_A$. The upper elevation guide block is coupled to injection housing 104, and the lower elevation guide block is coupled to barrel housing 105. The upper and lower elevation guide blocks are independently slidable on elevation linear rail 131E to permit movement of injection housing 104 relative to barrel housing 105 throughout an injection cycle. Continuing with FIG. 6A and FIG. 6B, thrust forks 647, 647' offset the force created by linear actuator 542 and allow injection unit 101 and liner actuator 542 to be offset relative to one another. To reduce misalignment between movable elevation part 540 and elevation axis $E_A$ a plurality of cam rollers 653 are mounted in line to each thrust fork 647, 647' to engage with support slots 555, shown in FIG. 5, provided in fixed elevation part 539.

Linear actuator 542 is coupled to movable elevation part 540 via biased coupling 546. Biased coupling 546 transfers force created by actuation of linear actuator 542 to movable elevation part 540. Biased coupling 546 includes a biasing member 656 that is sandwiched between a flanged thrust sleeve 657 and bridge 649. Thrust sleeve 657 abuts bridge 649 when coupled to linear actuator shaft 544 via a fastener, such as a socket head cap screw. In the current embodiment biasing member is energized to a holding state by coupling thrust sleeve 657 to shaft 544. When injection unit outlet 110 is brought into engagement with mold inlet 808 translation of shaft 544 and movable elevation part 540 coupled thereto continues in the retracted direction ↓ $R_D$ until biasing member 656 is sufficiently energized to a sealing state so as to create a fluid seal between injection unit outlet 110 and mold inlet 808. Energizing of biasing member 656 to sealing state assists in maintaining a fluid seal between injection unit outlet 110 and mold inlet 808 without continuous energization of linear actuator 542. Conversely, when shaft 544 and movable elevation part 540 are coupled thereto are translated in the extended direction $E_D$ as shown by arrow ↑ biasing member 656 is de-energized to the holding state prior to injection unit outlet 110 disengaging from mold inlet 808.

Figure 7:
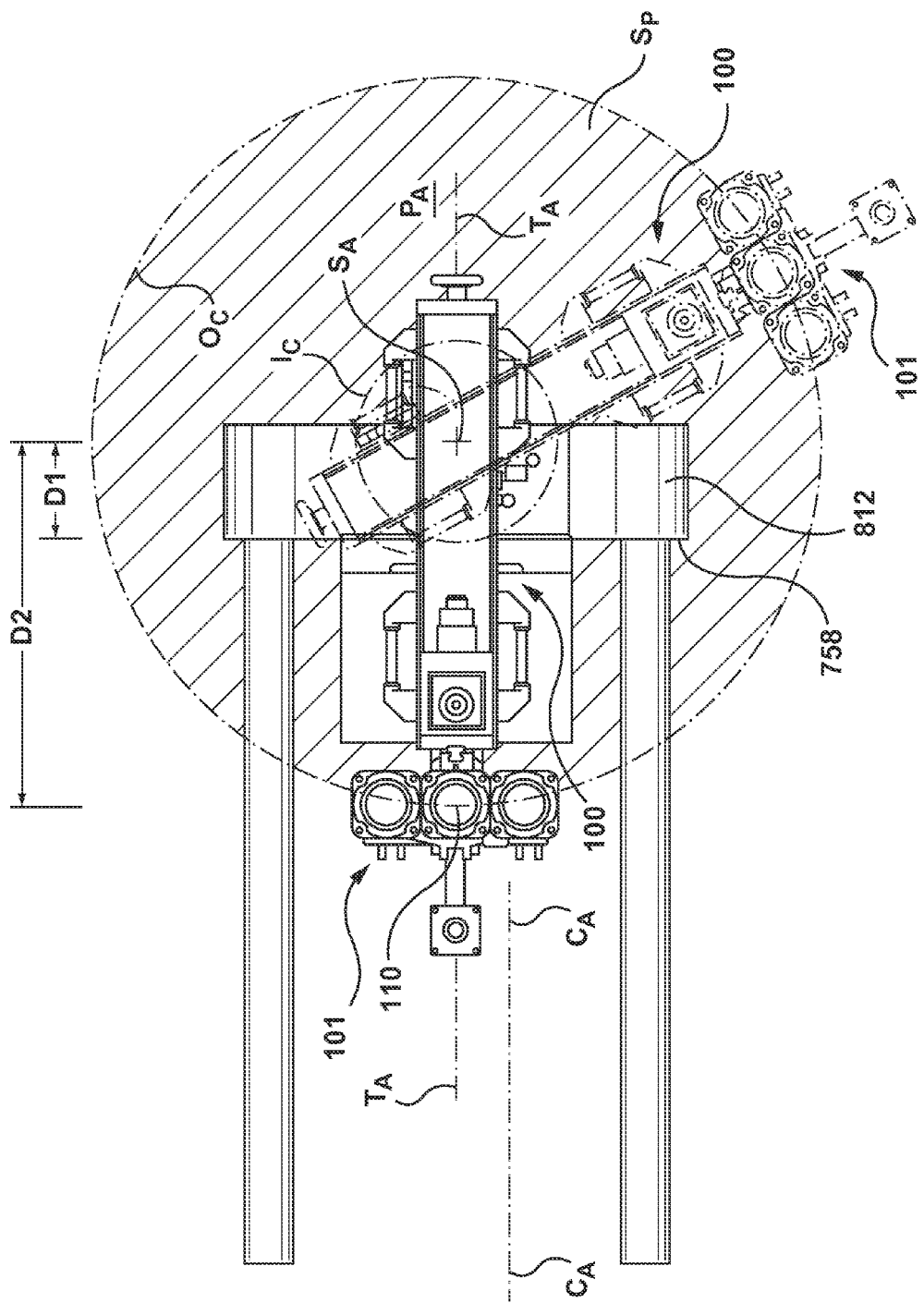
FIG. 7 is a top view of a portion of a molding cell in which the injection unit positioning apparatus is shown in an operational configuration and is shown in phantom in a non-operational configuration.

FIG. 7 is a top view of a portion of a molding cell in which injection unit positioning apparatus 100 and injection unit 101 are shown in an operational configuration, and in phantom in a non-operational configuration and FIG. 8 is a front perspective view of a portion of a molding cell in which injection unit positioning apparatus 100 and injection unit 101 are in a non-operational configuration.

Rotation of positioning assembly 111 about sweep axis $S_A$ when linear positioning assembly 115 is positioned such that injection unit 101 is relatively closer to sweep axis $S_A$ moves outlet 110 through an arc that is relatively smaller than rotation of positioning assembly 111 about sweep axis $S_A$ when linear positioning assembly 111 is positioned such that outlet 110 is relatively farther from sweep axis $S_A$. In the current embodiment, sweep axis $S_A$ is spaced a distance $D_1$ from a platen mounting surface 758 and sweep plane $S_P$ is substantially perpendicular to platen mounting surface 758. When angular positioning assembly 113 is positioned such that translation axis $T_A$ is substantially parallel to machine clamping axis $C_A$, as shown in FIG. 7, and linear displacement assembly 115 is in its fully retracted configuration, injection unit outlet 110 is also distance $D_1$ from sweep axis $S_A$, and outlet 110 is substantially aligned with stationary platen mounting surface 758. When linear positioning assembly 115 is in its fully extended configuration injection unit outlet 110 is spaced a distance $D_2$ from sweep axis $S_A$. As such, injection unit outlet 110 is positionable anywhere within an annular positioning area $P_A$ having an inner circumference $I_C$ defined by distance $D_1$ and having an outer circumference $O_C$ defined by distance $D_2$. Thus, the combination of angular positioning assembly 113, which allows injection unit outlet 110 to be swept 360° about sweep axis $S_A$, and linear positioning assembly 115, which translates injection unit outlet 110 linearly on sweep plane $S_P$, allows injection unit outlet 110 to be positioned to interface with, or line up with a mold inlet that is located within a broad operational area between the platens of a molding machine.

Referring to FIG. 8, the combination of angular positioning assembly 113 and linear positioning assembly 115 also allows injection unit 101 to be positioned away from mold 809 in a non-operational configuration. By positioning injection unit positioning apparatus 100 in a nonoperational configuration, in which barrel 103 and outlet 110 are spaced apart from mold 809, injection unit 101 can be easily accessed for service or maintenance. Furthermore, in the nonoperational configuration more room is available between the molding machine platens for mold change-over and/or mold maintenance without risking causing damage to the injection unit 101.

Figures 9, 9A:
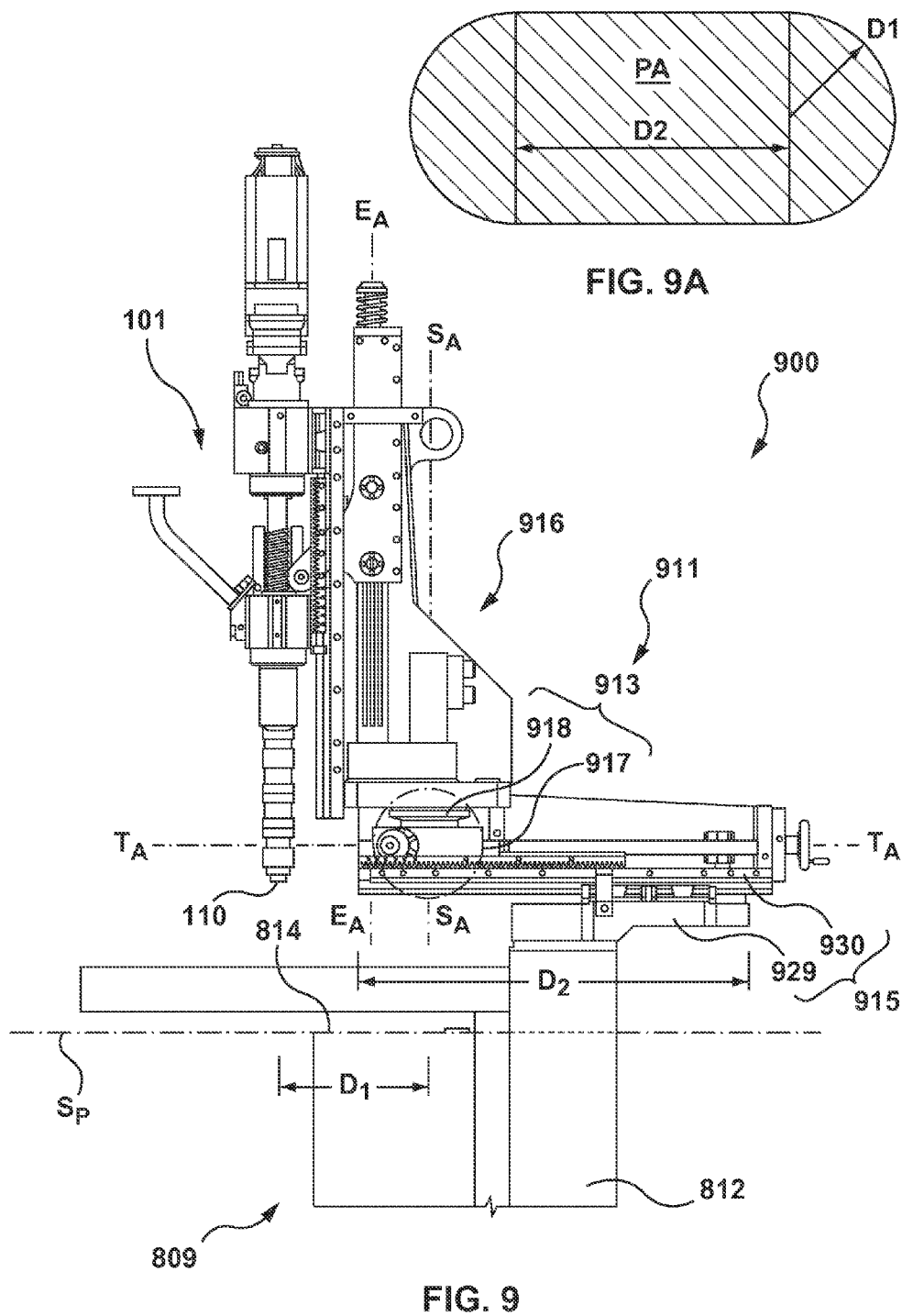
FIG. 9 is a side elevation view of a portion of a molding cell having an injection unit positioning apparatus in accordance with another embodiment hereof.
FIG. 9A is a representative view of the sweep area of the injection unit positioning apparatus of FIG. 9.

FIG. 9 is a side elevation view of a partial molding cell having an injection unit positioning apparatus 900 in accordance with another embodiment hereof. Features and aspects of the other embodiments may be used accordingly with the current embodiment. FIG. 9A is a representative view of the sweep area of the injection unit positioning apparatus 900 of FIG. 9. Injection unit positioning apparatus 900 includes a positioning assembly 911 interconnecting injection unit 101 to stationary platen 812. Positioning assembly 911 includes an angular positioning assembly 913 that permits rotation of injection unit 101 through sweep plane Sp that extends from sweep axis $S_A$ that is substantially perpendicular to an inlet surface 814 of mold 809, and also includes a linear positioning assembly 915 that permits linear translation of injection unit 101 on sweep plane $S_P$. In the current embodiment, positioning assembly further includes elevation assembly 916 that permits adjusting the elevation of injection unit 101 relative to sweep plane $S_P$. As shown in FIG. 9, elevation assembly 916 is in a retracted configuration. In the current embodiment, linear positioning assembly 915 is coupled to stationary plate 812, angular positioning assembly 913, is coupled to linear positioning assembly 915, and elevation assembly 916 is coupled to angular positioning assembly 913.

In the current embodiment when linear positioning assembly is in its fully retracted configuration injection unit outlet is aligned with stationary platen mounting surface and sweep axis $S_A$ is spaced a distance $D_1$ from injection unit outlet 110. When linear positioning assembly 915 is in its fully extended configuration movable linear part 930 has been translated a distance $D_2$ relative to fixed linear part 929 and injection unit outlet 110 remains distance $D_1$ from sweep axis $S_A$.

Angular positioning assembly 913 allows injection unit outlet 110 to be rotated 360° about sweep axis $S_A$; as such, as shown in FIG. 9A, injection unit outlet 110 is postionable anywhere within the capsule shaped positioning area $P_A$ having semicircular end regions defined by distance $D_1$ and a rectangular middle region of distance $D_2 \times (2D_1)$.

Figure 10A:
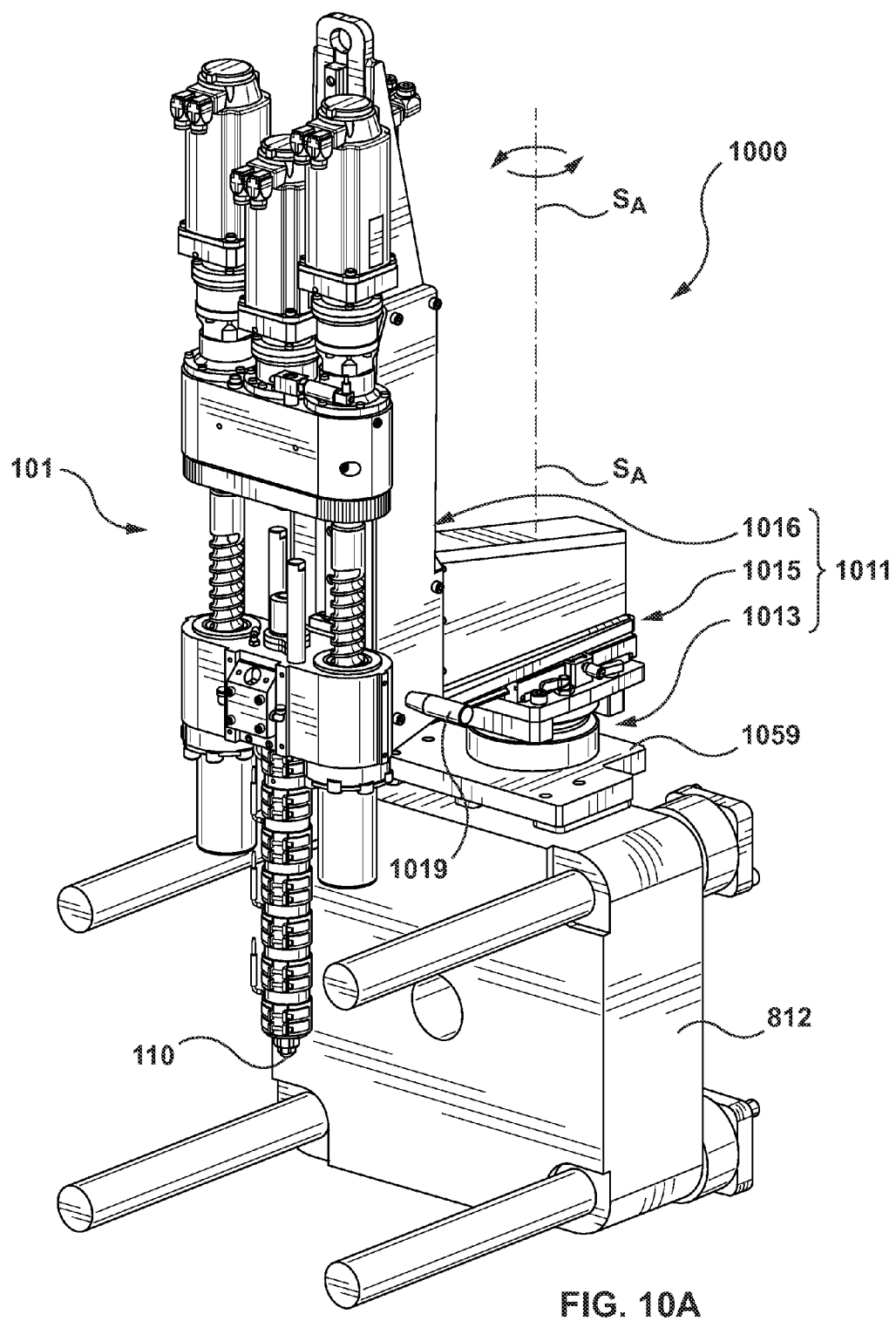
FIG. 10A is a front perspective view of an injection unit positioning apparatus in accordance with another embodiment hereof shown mounted to a platen of a molding machine and having an injection unit coupled thereto.
Figure 10B:
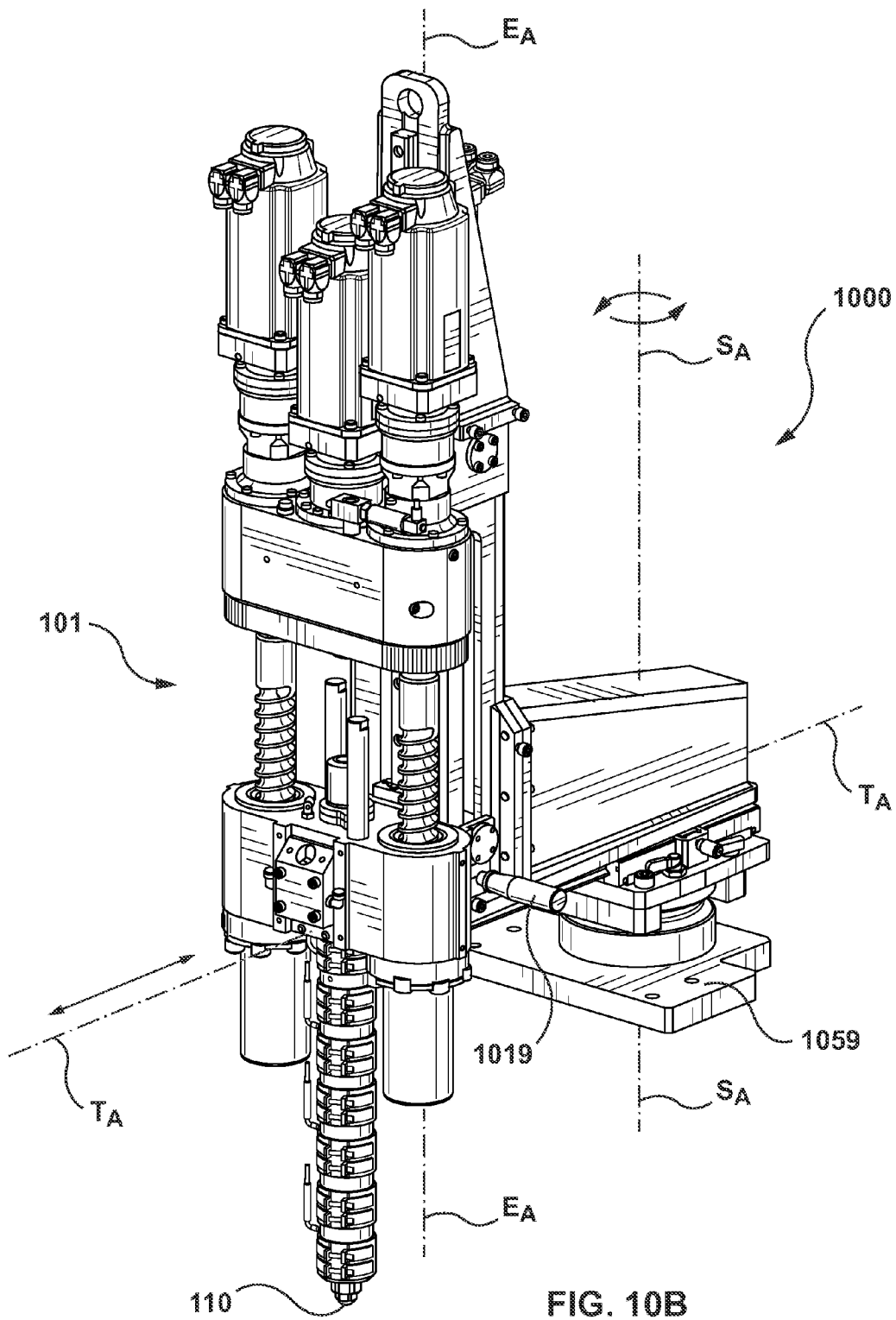
FIG. 10B is the injection unit positioning apparatus and injection unit of FIG. 10A removed from the platen of the molding machine.

FIG. 10A is a front perspective view of an injection unit positioning apparatus 1000 in accordance with another embodiment hereof shown mounted to stationary platen 812 of and having injection unit 101 coupled thereto. Features and aspects of the current embodiment may be used accordingly with the other embodiments. FIG. 10B is the injection unit positioning apparatus 1000 and injection unit 101 of FIG. 10A removed from stationary platen 812 of the molding machine.

Injection unit positioning apparatus 1000 includes positioning assembly 1011 interconnecting injection unit 101 to stationary platen 812. Positioning assembly 1011 includes angular positioning assembly 1013 that permits rotation of injection unit 101 about sweep axis $S_A$ as shown by arrows ↻ , and also includes linear positioning assembly 1015 that permits linear, or radial translation of injection unit 101 along sweep plane $S_P$ relative to sweep axis $S_A$, as shown by arrow ↔. Positioning assembly 1011 further includes elevation assembly 1016 that permits adjusting the elevation of injection unit outlet 110 relative to an inlet surface of a mold (not shown).

Figure 11A:
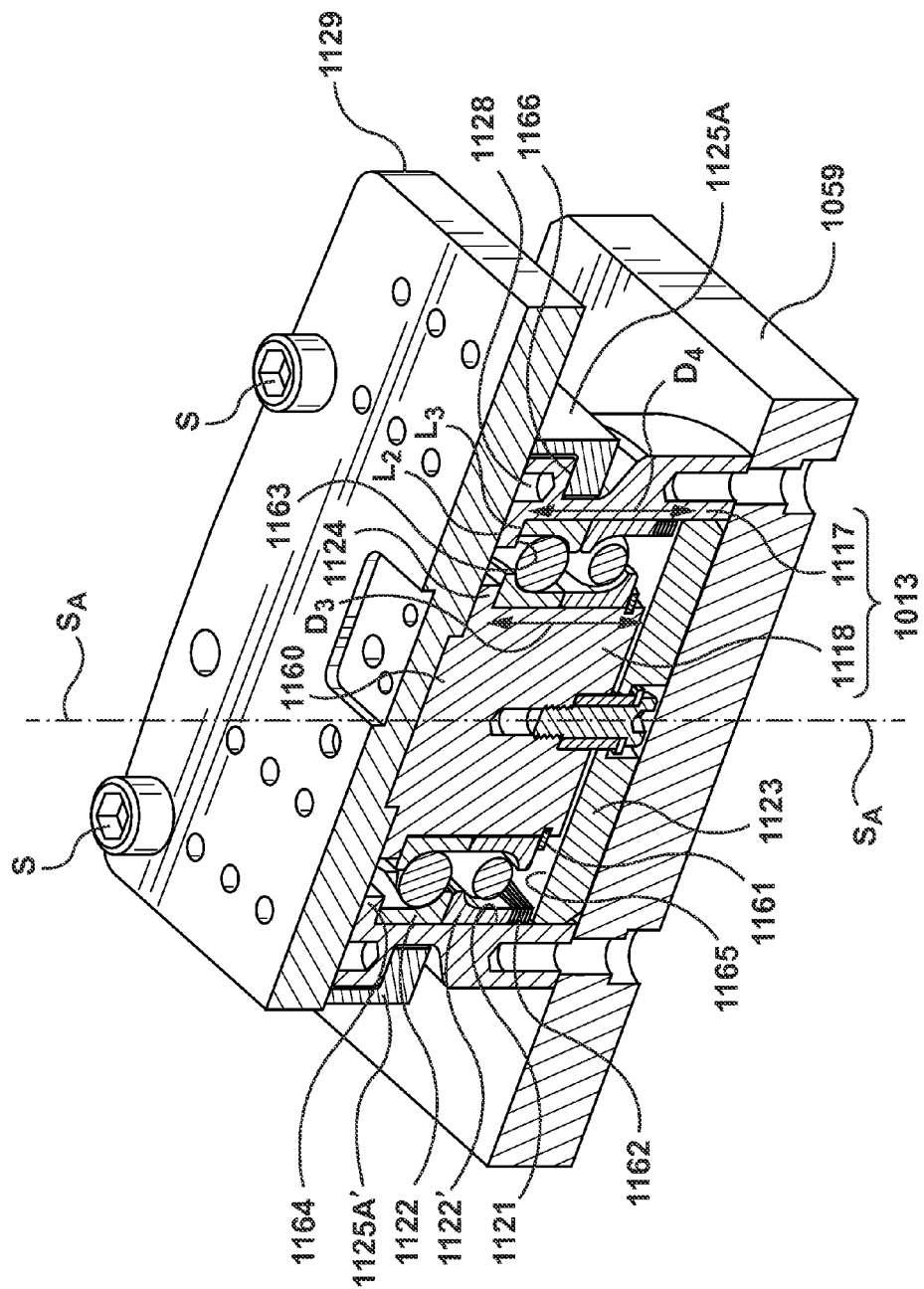
FIG. 11A is a perspective sectional view of the angular positioning assembly and the fixed linear part taken through line A-A of FIG. 11.
Figure 11B:
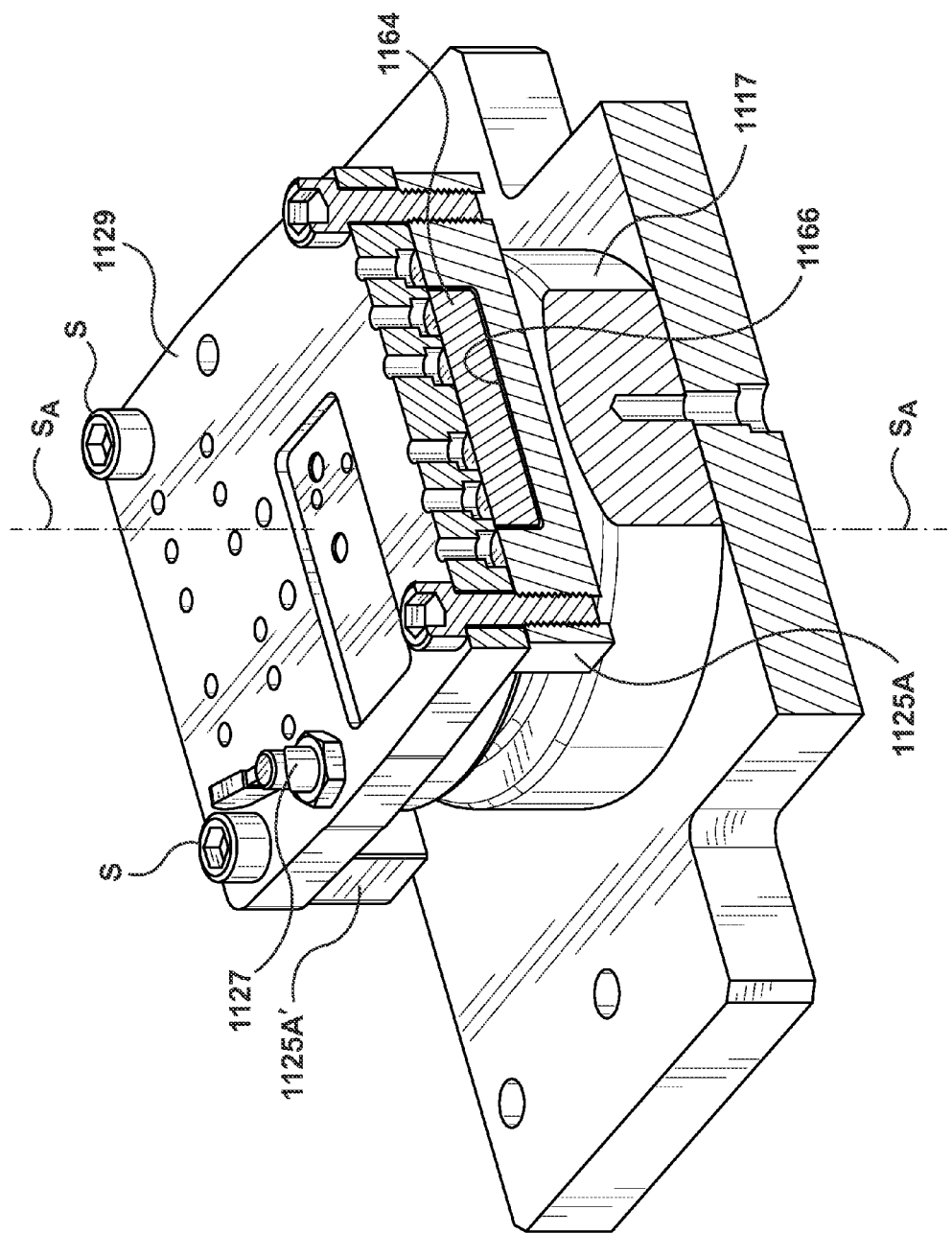
FIG. 11B is a perspective sectional view of the angular positioning assembly and the fixed linear part taken through line B-B of FIG. 11.

FIG. 11 is a side perspective view of angular positioning assembly 1013 and fixed linear part 1129 of injection unit positioning apparatus 1000. FIG. 11A is a perspective sectional view of angular positioning assembly 1013 and fixed linear part 1129 taken through line A-A of FIG. 11, and FIG. 11B is a perspective sectional view of angular positioning assembly 1013 and fixed linear part 1129 taken through line B-B of FIG. 11. Angular positioning assembly 1013 includes fixed rotary part 1117, movable rotary part 1118, bearings 1122, 1122' and retainer plate 1123. In the current embodiment fixed rotary part 1117 is coupled to an adaptor plate 1059 that is coupled to stationary platen 812. Movable rotary part 1118 is rotatable relative to fixed rotary part 1117 about $S_A$ and is able to rotate 360° about sweep axis $S_A$. Similar to the previous embodiment, rotation of movable rotary part 1118 relative to fixed rotary part 1117 is accomplished by an operator engaging a drive member, such as handle, 1019 shown in FIG. 10A, to push/pull injection unit positioning apparatus 1000 into a desired angular position.

In the current embodiment movable rotary part 1118 is a swivel pin rotatably coupled to fixed rotary part 1117 and fixed rotary part 1117 is a sleeve coupled to adaptor plate 1059 via fasteners, such as socket head cap screws. Movable rotary part 1118 includes flange 1124 a boss 1160 projecting upward from a top surface of movable rotary part 1118. Fixed linear part 1129 is coupled to movable rotary part 1118 to rotate therewith and is located relative to movable rotary part via boss 1160. In the current embodiment boss is a cylindrical protrusion that is concentric to sweep axis $S_A$.

Bearings 1122, 1122' are located in series on movable rotary part 1118 between flange 1124 and a cir-clip 1161 disposed in a groove in movable rotary part 111 to retain bearings 1122, 1122' on movable rotary part 1117. Bearings 1122, 1122' support movable rotary part 1118 and the remainder of injection unit positioning assembly 1011 relative to fixed rotary part 1117 and adaptor plate 1059 when injection unit positioning apparatus 1000 is translated between angular positions. In the current embodiment bearing 1122, 1122' are provided in the form of angular contact bearings by way of example and not limitation. Retainer plate 1123 is coupled to the bottom of movable rotary part 1118 and is spaced apart from bottom surface of movable rotary part 1118 via a sleeve. In the current embodiment, a biasing member 1162 is positioned between retainer plate 1123 and bearings 1122, 1122' to urge bearings 1122, 1122' into contact with the underside of flange 1124. In the current embodiment biasing member 1162 is provided in the form of a helical wave spring. Retainer plate 1123 allows movable rotary part 1118, bearings 1122, 1122', cir-clip 1161, and biasing member 1162 to be installed as a sub-assembly within fixed rotary part 1117.

Bore 1121 extends through fixed rotary part 1117 in which movable rotary part 1118 is rotatably disposed. Bore 1121 is sized to receive bearings 1122, 1122', biasing member 1162, and retainer plate 1123 therein. Fixed rotary part 1117 includes a groove extending therearound which defines a support flange 1164 at the top end of fixed rotary part 1117. Support flange 1164 provides an enlarged surface for mating with fixed linear part 1129 when angular positioning assembly 1013 is locked in a chosen angular position.

With fixed rotary part 1117 coupled to adaptor plate 1059 and movable rotary part 1118 disposed in bore 1121, the distance D3 from a bearing surface 1165 of retainer plate 1123 to shoulder 1165 on the underside of support flange 1164 is less than the distance D4 from bearing surface 1165 to shoulder 1163 of bore 1121.

Angular positioning assembly 1013 further includes friction clamp, such as angular friction clamp 1125A for allowing continuous angular positioning of movable rotary part 1118 relative to fixed rotary part 1117, and thus continuous angular positioning of outlet 110 on sweep plane $S_P$. As shown more clearly in FIGS. 11A and 11B, in the current embodiment angular friction clamp 1125A is a block that extends substantially the entire width of fixed linear part 1129, and includes a groove 1166 that conforms to the shape of flange 1164. Angular friction clamp 1125A can be engaged to hold movable rotary part 1118 in place relative to fixed rotary part 1117 at any angular position around sweep axis $S_A$, and can be disengaged to allow of movable rotary part 1118 to be rotated relative to fixed rotary part 1117. Angular friction clamp 1125A is coupled to the bottom side of fixed linear part 1129 by a pair of fasteners such as socket head cap screws S. In the current embodiment two angular friction clamps 1125A, 1125A' are provided on opposite sides of fixed rotary part 1117.

When angular friction clamp 1125A socket head cap screws S are loosened biasing member 1162 expands, and bearings 1122, 1122', press upon flange 1124, and movable rotary part 1118 and fixed linear part 1129 are lifted relative to fixed rotary part 1117 until the upper bearing 1122 contacts shoulder 1163 of fixed rotary part 1117. In this configuration angular friction clamp 1125A is disengaged and a gap is created between fixed rotary part 1117 and flange 1164 of fixed linear part 1129 at location $L_2$. With fixed linear part 1129 lifted relative to fixed rotary part 1117 angular positioning assembly 1013 is permitted to float, whereby the force required to move injection unit positioning apparatus 1000 to a specific angular position is less than if fixed linear part 1129 remained in contact with fixed linear part 1129

When socket head cap screws S associated with angular friction clamp 1125A are tightened groove 1166 pulls on flange 1164 and fixed linear part 1129 is pulled downward; flange 1124 presses upon bearings 1122, 1122', and biasing member 1162 is compressed until fixed linear part 1129 is brought into engagement with flange 1164. In this configuration angular friction clamp 1125A is engaged and a gap is created between upper bearing 1122 and shoulder 1163 at location $L_3$, flange 1164 is sandwiched between groove 1166 and fixed linear part 1129, to hold angular positioning assembly 1013 in a specific angular position. An advantage of angular positioning assembly 1013 of the current embodiment is that when angular friction clamp 1125A is engaged, force that is transferred to angular positioning assembly 1013, for example, via engagement between outlet 110 of injection unit 101 and inlet 808 of mold 809 is transferred from fixed linear part 1129 to fixed rotary part and is substantially isolated from movable rotary part and bearings 1122, 1122'.

In the current embodiment, angular positioning assembly 1013 includes index pin 1127 and at least one index hole 1128. Engagement between index pin 1127 and index hole 1128 allows angular positioning assembly 1013 to be locked at a discrete angular position about sweep axis $S_A$. In the current embodiment index hole 1128 is provided in fixed rotary part 1117 and index pin 1127 extends through fixed linear part to engage with index hole 1128, and lock angular positioning assembly 1013 at a discrete angular position.

Figure 12:
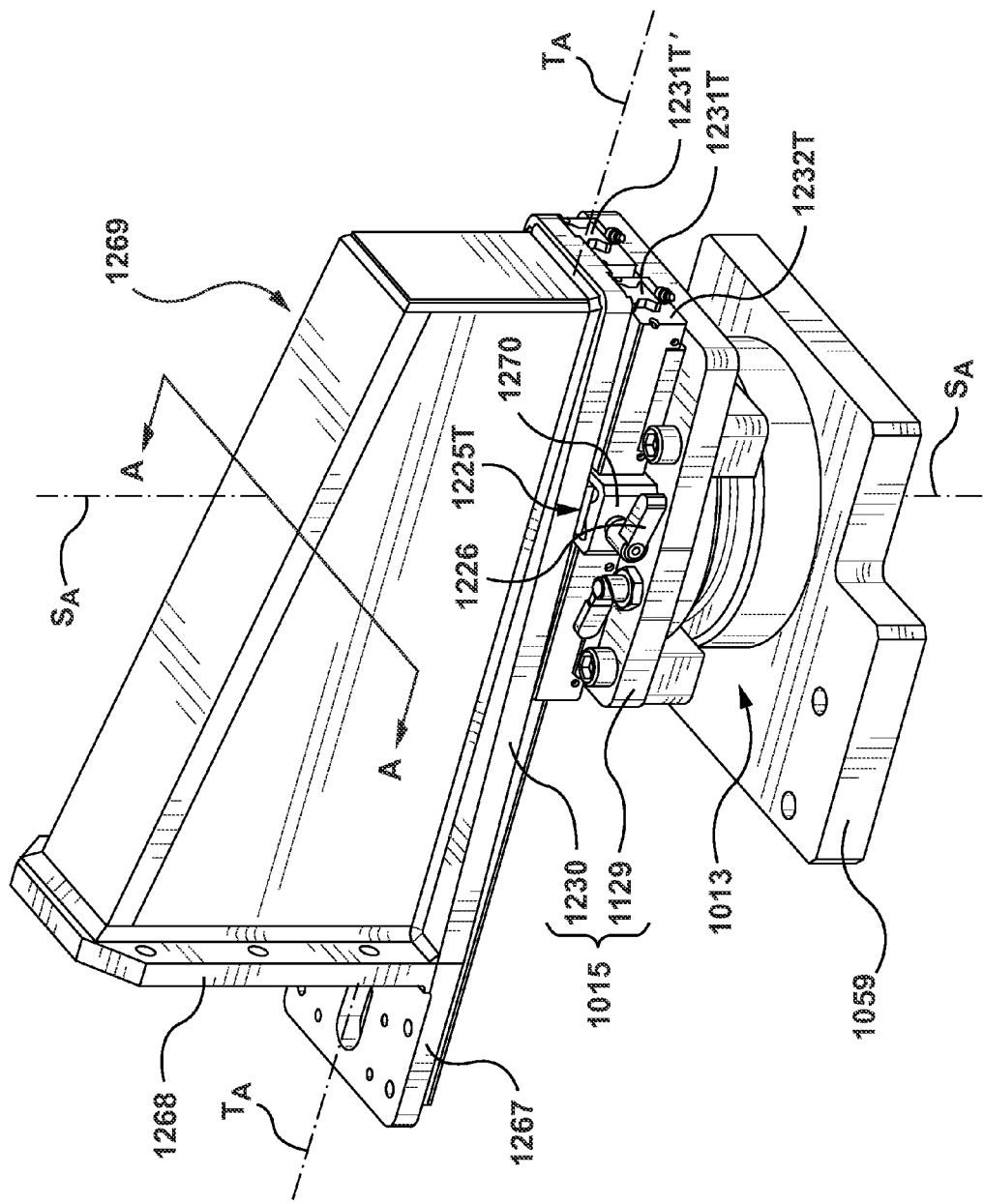
FIG. 12 is a side perspective view of a linear positioning assembly in an extended position.
Figure 12A:
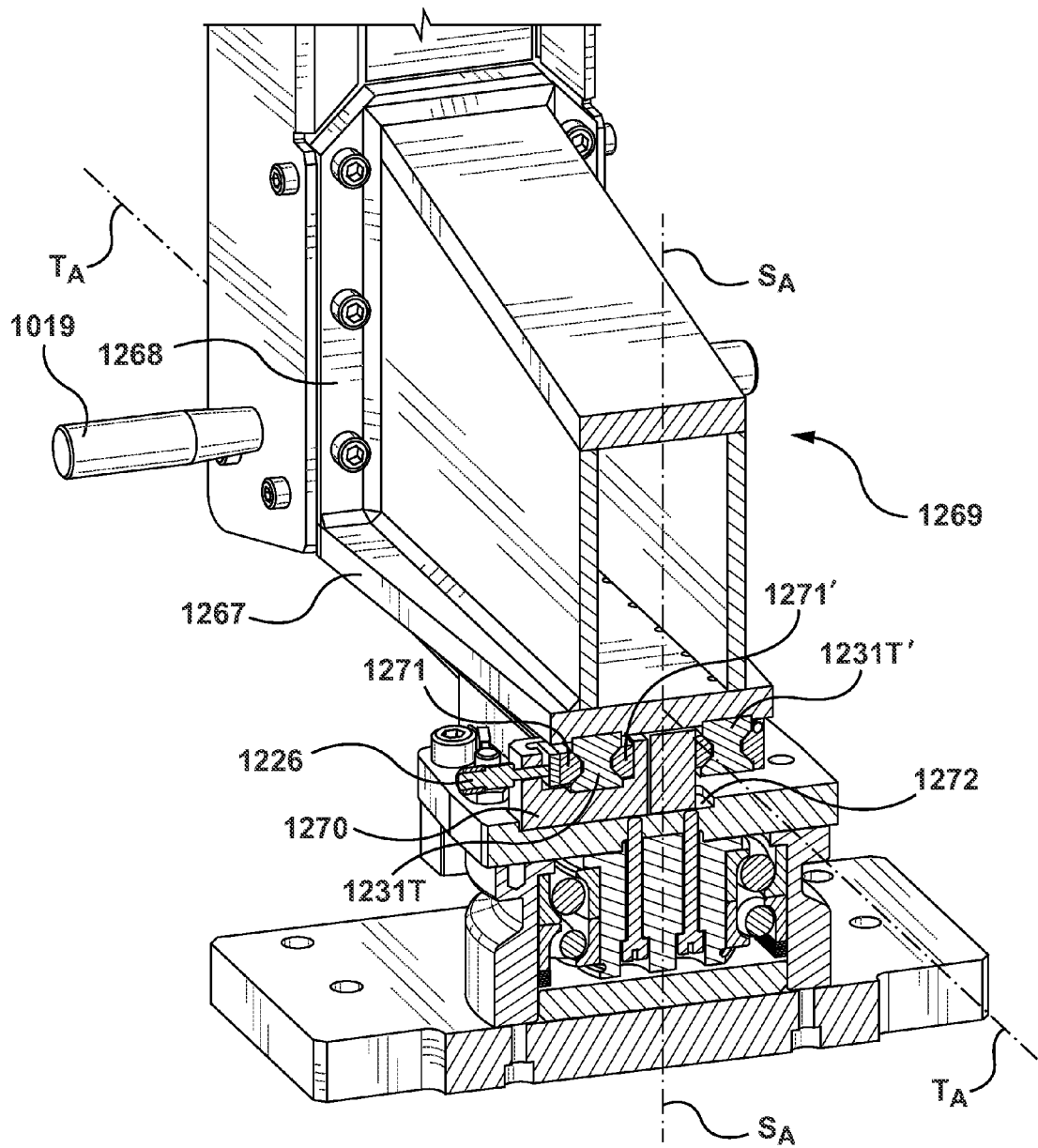
FIG. 12A is a perspective sectional view of the linear positioning assembly taken through line A-A of FIG. 12.

Turning now to FIGS. 12 and 12A in which FIG. 12 is a side perspective view of linear positioning assembly 1115 in an extended position, and FIG. 12A is a perspective sectional view of linear positioning assembly taken through FIG. line A-A of FIG. 12. Linear positioning assembly 1015 includes fixed linear part 1129 and movable linear part 1230, moveable linear part 1230 is translatable relative to fixed linear part 1129 along a translation axis $T_A$ that is is substantially perpendicular to sweep axis $S_A$. In the current embodiment, movable linear part 1230 is provided in the form of a translation rail plate 1267 and a brace plate 1268 which is transverse to translation rail plate 1267. In the current embodiment, brace plate 1268 is substantially perpendicular to translation rail plate 1267. Movable linear part 1230 further includes a plurality of support plates 1269 interconnecting translation rail plate 1267 and brace plate 1268. In the current embodiment movable linear part 1230 includes four support plates (two side plates, a top plate and an end plate), however, more or fewer support plates are contemplated. Support plates 1269, together with translation rail plate 1267 and brace plate 1268 define a hollow trapezoidal box. In the current embodiment translation rail plate 1267, brace plate 1268, and support plates 1269 are provided in the form of a unitary weldment, however, in an alternative embodiment (not shown) translation rail plate 1267, brace plate 1268 and support plates 1269 are individual plates that are coupled together by fasteners, such as socket head cap screws.

Linear rails, such as translation linear rails 1231T, 1231T' are provided between fixed linear part 1129 and movable linear part 1230 to guide movement of movable linear part 1320 relative to fixed linear part 1129 and to allow for reduced friction therebetween when movable linear part 1230 is translated relative to fixed linear part 1129. In the current embodiment translation linear rails 1231T, 1231T' are arranged such that a plurality of linear guide blocks, such as translation guide blocks 1232T are coupled to the top of fixed linear part 1129 to receive a respective translation linear rail 1231T, 1231T' coupled to the bottom of translation rail plate 1267.

Linear positioning assembly 1015 further includes a friction clamp, such as translation friction clamp 1225T, for allowing continuous linear positioning of movable linear part 1230 relative to fixed linear part 1129. In the current embodiment translation friction clamp 1225T is a linear rail clamp sandwiched between adjacent linear guides 1232 associated with one of translation linear rails 1231T, 1231T'. Translation friction clamp 1225T includes a base 1270, opposing jaws 1271, 1271' and an engagement lever 1226. In the current embodiment base 1270 is generally U-shaped and is located in a pocket 1272 in fixed linear part 1129. Pocket 1272 is sized to allow movement of U-shaped base 1270 in a direction that is substantially perpendicular to translation axis $T_A$ while restricting movement of U-shaped base 1270 in a direction substantially parallel to translation axis $T_A$. Jaw 1271 is coupled to one arm of U-shaped base 1270, and a threaded shaft that projects from engagement lever 1226 extends through a correspondingly threaded hole in the other arm of U-shaped base 1270, and is coupled to jaw 1271'. Jaw 1271' is rotatably coupled to an end of the threaded shaft independent of threads such that rotational movement of engagement lever 1226 is translated into linear movement of jaw 1271'. In the current embodiment, when engagement lever 1226L is rotated in the clockwise direction jaw 1271' is translated towards translation linear rail 1231T. Once jaw 1271' contacts one side of translation linear rail 1231T further rotation of lever 1226 causes U-shaped base 1270 to slide in pocket 1272 until opposing jaw 1271 is pulled into contact with the other side of translation linear rail 1231T such that translation friction clamp 1225T grips translation linear rail 1231T. With translation friction clamp 1225T gripping translation linear rail 1231T, translation of movable linear part 1230 relative to fixed linear part 1129 is prevented due to the engagement between U-shaped base 1270 and pocket. An advantage of the U-shaped base 1270 and pocket 1272 arrangement described above is that when translation friction clamp 1225T is engaged both jaws 1271, 1271' grip, or apply force to translation linear rail 1231T, and when translation friction clamp 1225T is disengaged, neither of jaws 1271, 1271' apply force to translation linear rail 1231T. In the current embodiment jaws 1271, 1271' each have an engagement surface that confirms to the cross-sectional profile of translation linear rail 1231T to increase the holding power of translation friction clamp 1225T.

In the current embodiment, translation of movable linear part 1230 relative to fixed linear part 1129 is a manual process accomplished by operator applying force to movable linear part 1230 along translation axis $T_A$ when translation friction clamp 1225T is disengaged.

Figure 13:
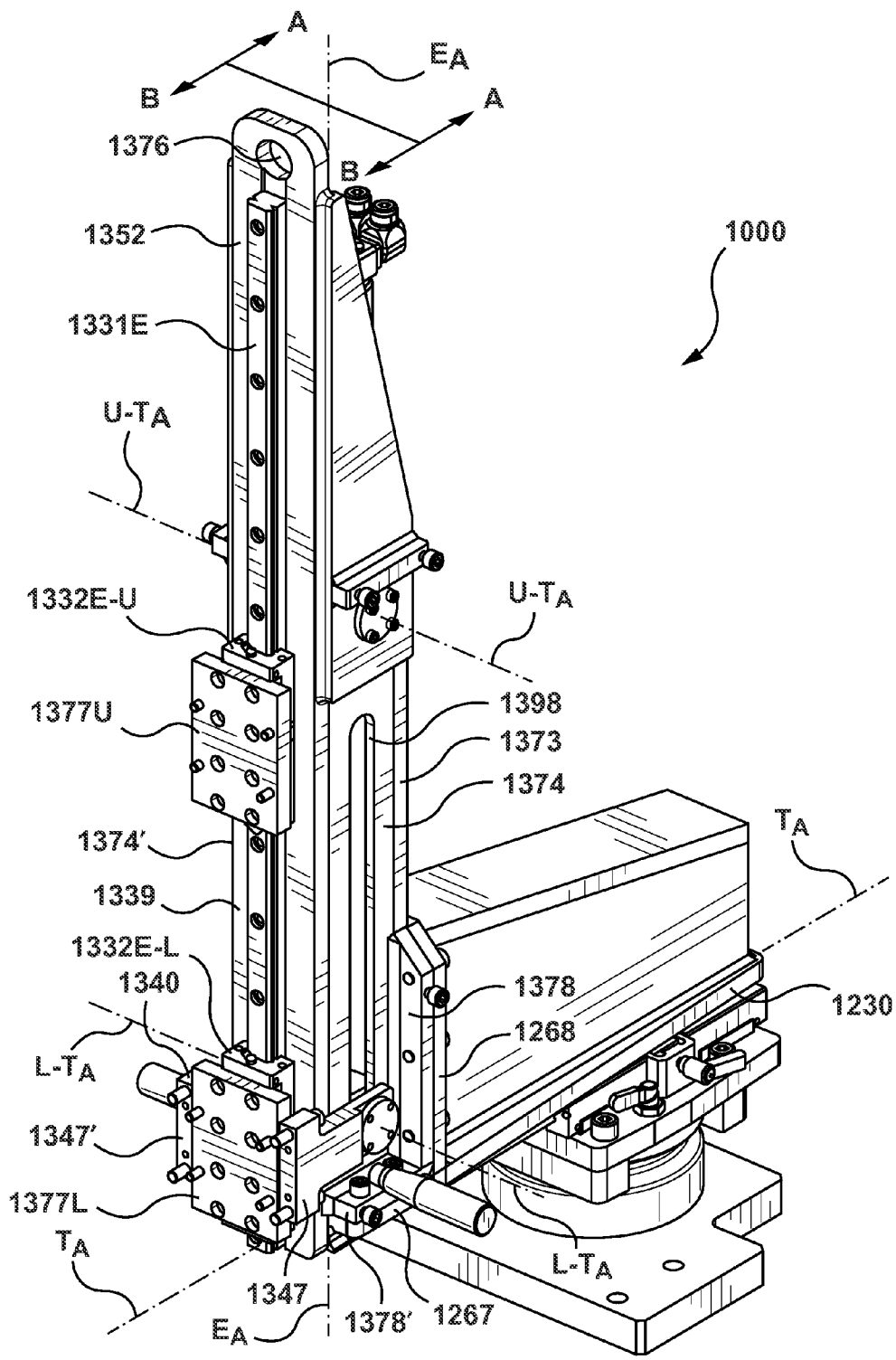
FIG. 13 is a front perspective view of injection unit positioning apparatus of FIG. 10A and FIG. 10B.
Figure 13A:
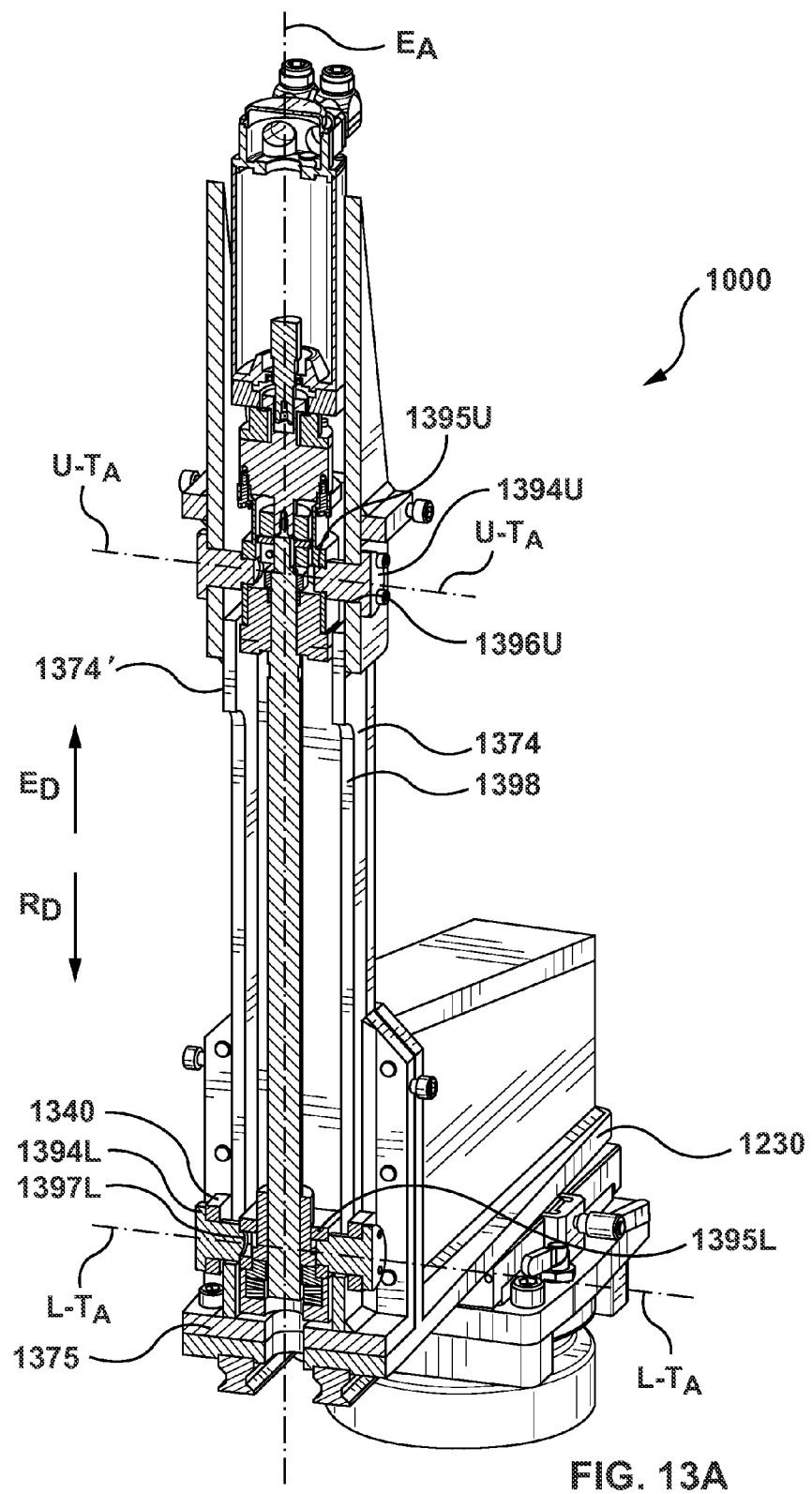
FIG. 13A is a front sectional perspective view of the injection unit positioning apparatus taken along line A-A of FIG. 13.
Figure 13B:
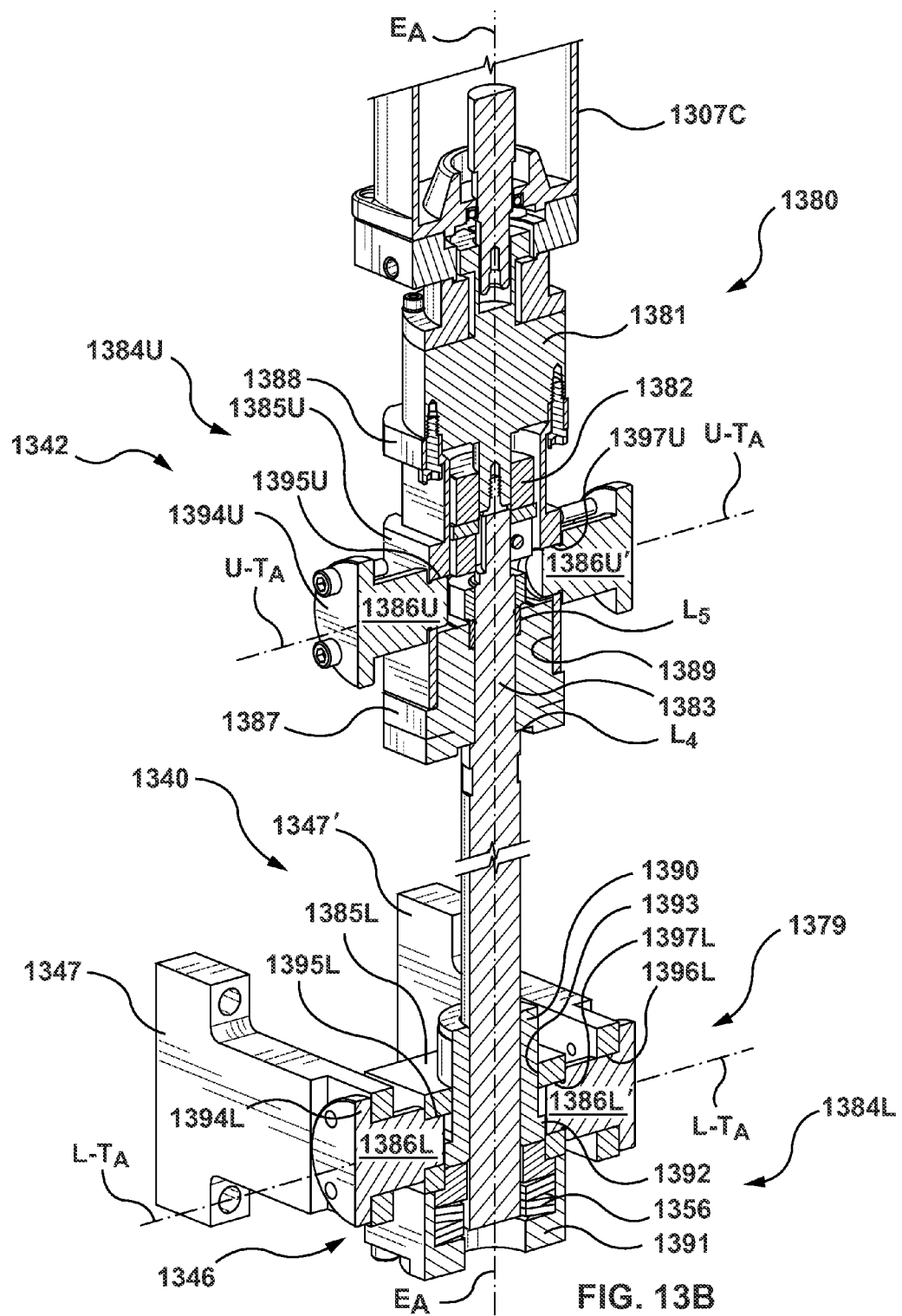
FIG. 13B is a rear sectional perspective view of an elevation drive assembly and a movable elevation part also taken along line A-A of FIG. 13.

FIG. 13 is a front perspective view of injection unit positioning apparatus 1000, FIG. 13A is a front sectional perspective view of injection unit positioning apparatus 1000 taken along line A-A of FIG. 13, and FIG. 13B is a rear sectional perspective view of a portion of elevation assembly and movable elevation part taken along line B-B of FIG. 13. Elevation assembly 1016 includes fixed elevation part 1339, movable elevation part 1340, and linear actuator 1342. Movable elevation part 1340 is translatable relative to fixed elevation part 1339 along an elevation axis $E_A$ that is at an angle relative to translation axis $T_A$.

In the current embodiment fixed elevation part 1339 is removably coupled to movable linear part 1230. Fixed elevation part 1339 includes elevation rail plate 1352 and a back plate 1373 that are coupled together and spaced apart by a pair of side plates 1374, 1374'. Together elevation rail plate 1352, back plate 1373 and side plates 1374, 1374' define a hollow elongate box like structure that is enclosed at a bottom end by a base plate 1375. Elevation rail plate 1352 defines a groove in which a linear rail, such as elevation linear rail 1331U, is received. Elevation rail plate 1352 further includes a lifting bore 1376 by which injection unit positioning apparatus 1000 can be attached to a lifting device such as an overhead crane or the like (not shown) for transporting injection unit positioning apparatus 1000 to or from a molding machine (not shown).

A pair of linear guide blocks, such as upper elevation guide block 1332E-U and lower elevation guide block 1332E-L are slidably coupled to elevation linear rail 1331E. Upper and lower elevation guide blocks 1332E-U, 1332E-L maintain alignment between injection unit 101 and elevation axis $E_A$. In the current embodiment injection housing 104 is coupled to upper elevation guide block 1332E-U via an upper mounting plate 1377U, whereas barrel housing 105 is coupled to lower elevation guide block 1332E-L via a lower mounting plate 1377L. Upper elevation guide block 1332E-U and lower elevation guide block 1332E-L are slidably independent from each other to allow injection housing 104 to move relative to barrel housing 105 throughout an injection molding cycle.

Base plate 1375 and a portion of back plate 1373 define respective tabs 1378, 1378' by which fixed elevation part 1339 is coupled to movable linear part 1230. More specifically, back plate 1373 of fixed elevation part 1339 is coupled to brace plate 1268 via fasteners, such as socket head cap screws, extending between brace plate 1268 and tab 1378, and base plate 1375 of fixed elevation part 1339 is coupled to translation rail plate 1267 via fasteners, such as socket head cap screws, extending between translation rail plate 1267 and tab 1378'.

In the current embodiment elevation rail plate 1352, side plates 1374, 1374', back plate 1373 and base plate 1375 are provided in the form of a unitary weldment, however, in an alternative embodiment (not shown) elevation rail plate 1352, side plates 1374, 1374', back plate 1373 and base plate 1375 are individual plates that are coupled together by fasteners, such as socket head cap screws.

Movable elevation part 1340 includes a pair of thrust forks 1347, 1347' coupled to barrel housing 105 of injection unit 101. Thrust forks 1347, 1347' and injection unit 101, when coupled thereto, are translatable relative to fixed elevation part 1339 between an extended position and a retracted position via linear actuator 1342. Thrust forks 1347, 1347' offset the force created by linear actuator 1342 and allow injection unit 101 and linear actuator 1342 to be offset relative to one another.

Linear actuator 1342 includes a movable drive assembly 1379 associated with movable elevation part 1340 and a fixed drive assembly 1380 associated with fixed elevation part 1339. Fixed drive assembly includes a motor, such as servo motor 1307C, a gear box 1381, a sleeve coupler 1382 and a ball screw 1383. Fixed drive assembly 1380 is coupled to fixed elevation part 1339 via an upper trunnion assembly 1384U which includes a upper trunnion block 1385U, opposing upper trunnion pins 1386U, 1386U' and a fixed support 1387. Movable drive assembly 1379 is coupled to movable elevation part 1340 via biased coupling 1346 and a lower trunnion assembly 1384L which includes a lower trunnion block 1385L and opposing lower trunnion pins 1386L, 1386L'.

Servo motor 1307C and gear box 1381 are coupled together and connected a coupling flange 1388 that projects upward from upper trunnion block 1385U. Ball screw 1383 extends through upper trunnion block 1385U and is coupled to gear box 1381 via sleeve coupler 1382 to rotate therewith upon rotation of servo motor 1307C. Ball screw 1383 extends through fixed support 1387 which is located in a support pocket 1389 in the bottom of upper trunnion block 1385U.

Ball screw 1383 is radially supported relative to upper trunnion block 1385U via engagement between ball screw 1383 fixed support 1387, whereas ball screw 1383 is axially supported relative to upper trunnion block 1385U via engagement between ball screw 1383 and fixed support 1387 as shown at location L4 and engagement between ball screw coupling nut and fixed support 1387 as shown at location L5. Below fixed support 1387, ball screw 1383 defines a precision screw portion that engages with a ball nut 1390 of movable drive assembly 1379. Rotation of ball screw 1383, via servo motor 1307C, is translated into linear motion of ball nut 1390 and subsequently linear motion of movable drive assembly 1379 coupled thereto. In the current embodiment, the arrangement of fixed elevation part 1339, movable elevation part 1340 and linear actuator 1342 is such that when injection unit 101 is translated in the retracted direction $R_D$ as shown by arrow ↓ in FIG. 14, movable drive assembly 1379 is translated away from fixed drive assembly 1380.

Movable drive assembly 1379 includes ball nut 1390, biasing member 1356 and a biasing member retainer 1391. In the current embodiment, ball nut 1390 includes a flange portion 1392. Ball nut 1390 extends through a receiving bore 1393 in lower trunnion block 1385L, and flange portion 1392 of ball nut 1390 is held against a bottom surface of lower trunnion block 1385L via biased coupling 1346.

As discussed above fixed drive assembly 1380 is coupled to fixed elevation part 1339 via upper trunnion assembly 1384U. Each upper trunnion pin 1386U includes a radially extending flange 1394U and an engagement surface 1395U. Upper trunnion pin 1386U is received in a trunnion bore 1396U that extends through an extension portion of side plate 1374 and is retained therein via fasteners, such as socket head cap screws, extending between flange 1394U and side plate 1374. In the current embodiment, the thickness of side plate 1374 extension portion is greater than the thickness of the remainder of side plate 1374 to support transmission loads generated by linear actuator 1342. Engagement surface 1395U is slidably received in a pivot bore 1397U in upper trunnion block 1385U. The arrangement of fixed elevation part 1339, upper trunnion pins 1386U, and upper trunnion block 1385U is such that upper trunnion block 1385U, and fixed drive assembly 1380 coupled thereto are rotatable relative to upper trunnion pins 1386 along an upper trunnion axis U-$T_A$ that extends axially through opposing upper engagement surfaces' 1395.

Movable drive assembly 1379 is coupled to movable elevation part 1340 via lower trunnion assembly 1384L. Each lower trunnion pin 1386L includes a radially extending flange 1394L and an engagement surface 1395L. Lower trunnion pin 1386L is received in a trunnion bore 1396L that extends through a respective thrust fork 1347 and is retained therein via fasteners, such as socket head cap screws, extending between flange 1394L and thrust fork 1347. Lower trunnion pin 1386L further extends through an elongate clearance slot 1398 in side plate 1374 that accommodates translation of movable elevation part 1340 and lower trunnion assembly 1384 along elevation axis $E_A$. In the current embodiment, the upper and lower elevation limits of movable elevation part 1340 are defined by the length of slot 1398. Engagement surface 1395L is slidably received in a pivot bore 1397L in lower trunnion block 1385L. The arrangement of lower trunnion pins 1386L and lower trunnion block 1385L is such that lower trunnion block 1385L, and movable drive assembly 1379 coupled thereto, are rotatable relative to lower trunnion pins 1386L along a lower trunnion axis $LT_A$ that extends axially through opposing lower engagement surfaces' 1395L while thrust forks 1347, 1347' remain coupled to barrel housing 105.

Upper and lower trunnion assemblies 1384U, 1384L described above maintain the linear alignment of linear actuator 1342 while at the same time permitting a small amount of flexing or bowing of fixed elevation assembly 1016, such as when outlet 110 of injection unit 101 is brought into engagement with an inlet 808 of mold 809, without also causing ball screw 1383 to flex or bow.

As mentioned above, ball nut 1390 is held against the bottom surface of lower trunnion block 1385L via biased coupling 1346. Biased coupling 1346 transfers force created by linear actuator 1342 to movable elevation part 1340. Biased coupling 1346 includes biasing member 1356 that is sandwiched between flange 1392 and biasing member retainer 1391. In the current embodiment biasing member 1356 is energized to a holding state by coupling biasing member retainer 1391 to lower trunnion block 1385L. In operation, movable drive assembly 1379, movable elevation part 1340, and injection unit 101 are translated in the retracted direction $R_D$ until injection unit outlet 110 is brought into engagement with mold inlet 808. At this point, rotation of ball screw 1383 continues, which causes ball nut 1390 to continue translating in the retracted direction $R_D$; flange 1392 of ball nut 1390 separates from the bottom of lower trunnion block 1385L to further compress biasing member 1356 while movable elevation part 1340 and lower trunnion assembly 1384 remain stationary. Further translation of ball nut 1390 away from trunnion block 1385 continues until biasing member 1356 is energized to a sealing state in which biasing member 1356 bears upon flange 1392 of ball nut 1390 to apply force in the retracted direction $R_D$ to lower trunnion assembly 1384L, movable elevation part 1340, and injection unit outlet 110 to create a fluid seal between injection unit outlet 110 and mold inlet 808 that can withstand injection pressure. Energizing biasing member 1356 to sealing state assists in maintaining a fluid seal between injection unit outlet 110 and mold inlet 808 without continuous energization of servo motor 1307C.

Figure 14:
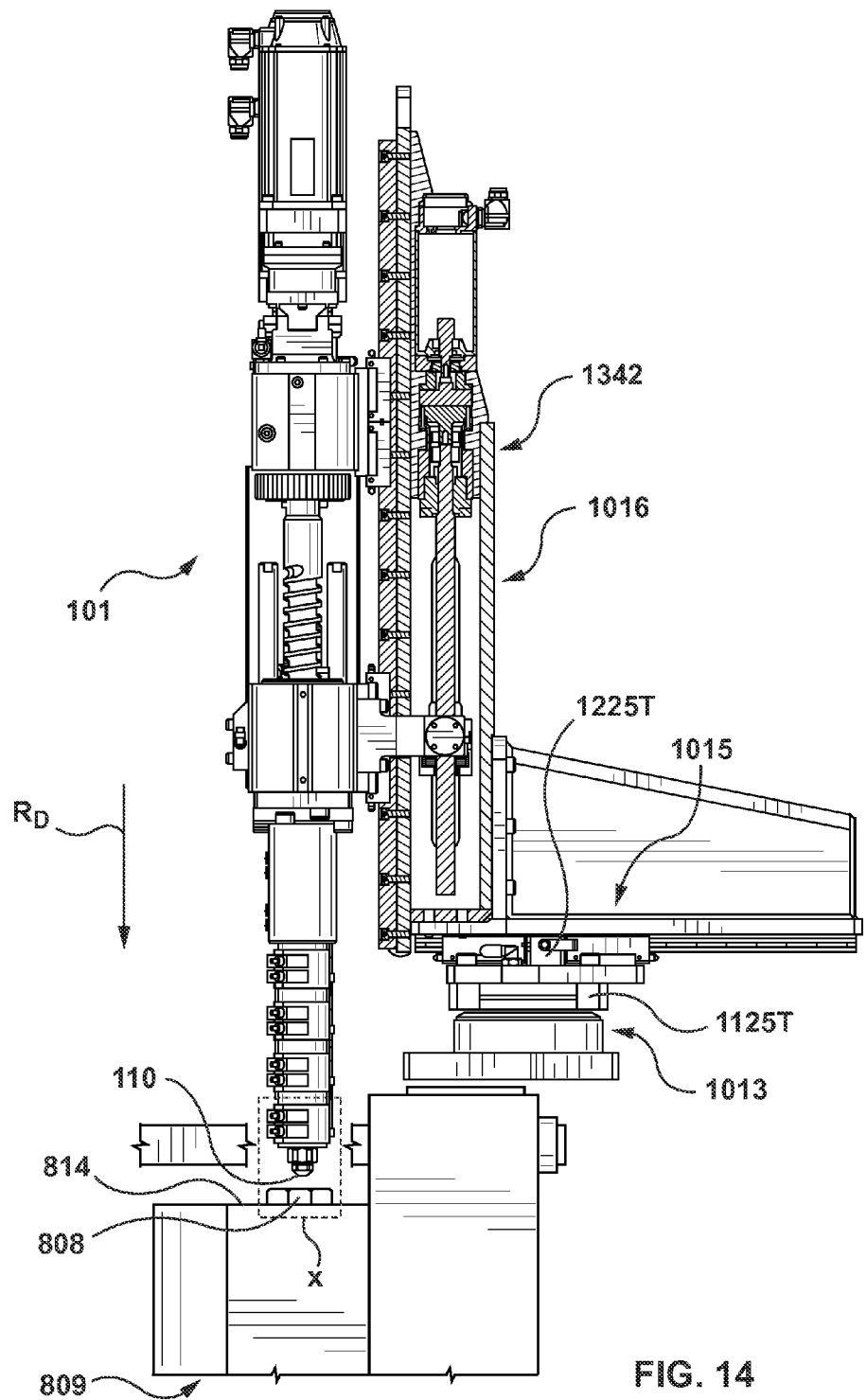
FIG. 14 is a side perspective view of the injection unit positioning apparatus with the injection unit positioned in approximate alignment with an inlet of a mold.

FIG. 14 is a side perspective view of injection unit positioning apparatus 1000 with injection unit 101 positioned in approximate alignment with inlet 808 of mold 809, and FIGS. 14A to 14D are sequential views of an enlarged portion X of FIG. 14 depicting injection unit outlet 110 being brought from approximate alignment with inlet 808 into precise alignment with inlet 808.

In the current embodiment, outlet 110 of injection unit 101 is brought into an approximate alignment position with inlet 808 of mold by manually manipulating the angular and linear positions of angular positioning assembly 1013 and linear positioning assembly 1015 when angular friction clamp 1125A and translation friction clamp 1225T are disengaged and outlet 110 is positioned, for example three to five millimeters above inlet 808'.

Referring also to FIG. 14A to FIG. 14D, outlet 110 is shown in approximate alignment with inlet 808, and angular friction clamp 1125A and translation friction clamp 1225T remain disengaged. Outlet 110 is in approximate alignment with inlet 808 when angular and linear position of the outlet centerline O-$C_L$ are within, for example, three to five millimeters of the angular and linear position of inlet centerline I-$C_L$. Referring to FIG. 14A, with outlet 110 in the approximate alignment position, linear actuator 1342 can be further translated in the retracted direction $R_D$. Referring to FIGS. 14B and 14C, as the convex outer surface of outlet 110 engages with the concave inner surface of inlet 808, further translation of linear actuator 1342 in retracted direction $R_D$ causes angular positioning assembly 1013 and linear positioning assembly 1015 to self-align which brings outlet center line O-$C_L$ closer to inlet center line I-$C_L$. Referring to FIG.

14D, when convex outer surface of outlet 110 is fully seated in concave inner surface of inlet 808, outlet center line O-$C_L$ is substantially with inlet center line I-$C_L$. Angular friction clamp 1125A and translation friction clamp 1225T can be engaged to maintain precision alignment between outlet 110 and inlet 808, and linear actuator 1342 can continue translating in the retracted direction until biased coupling 1346 is sufficiently energized to maintain a fluid seal between outlet 110 and inlet 808. At this point, injection unit positioning apparatus 1000 is configured for injection unit 101 to commence injection.

In each of the aforementioned embodiments the injection unit may be an auxiliary, or add-on injection unit that is used in association with a conventional molding machine or may be an injection unit of a multi-injection unit molding machine.

In the current embodiment the injection unit positioning apparatus is coupled to a top surface of the stationary platen of a molding machine by way of example and not limitation. In an alternative embodiment (not shown) the injection unit positioning apparatus is coupled to any surface of the stationary platen or moving platen of a molding machine. In another embodiment (not shown) the injection unit positioning apparatus is coupled to a molding machine at a location other than a platen. In another alternative embodiment (not shown) the injection unit positioning apparatus is coupled to a moving center block in a stack mold application. In a further alternative embodiment (not shown) the injection unit positioning apparatus is coupled to a frame that is adjacent to a molding machine.

In each of the previous embodiments, the injection unit positioning apparatus is described as permitting injection unit 101 to rotate 360° about sweep axis $S_A$ by way of example and not limitation. It should be understood that practical limitations, such as electrical connections etc. between injection unit 101 and, for example, a controller thereof may reduce the total sweep area $S_A$ of the angular position assembly to less than 360°. In an embodiment (not shown) the sweep area $S_A$ of the injection unit positioning apparatus is limited to about 180°, specifically, about 90° from the clamping axis $C_A$ toward the operator side of the molding machine, and about 90° from the clamping axis $C_A$ away from the operator side of the molding machine. Other sweep areas $S_A$ that are less than 360° are also contemplated. In such configurations the angular positioning assembly may include mechanical hard-stops to limit the angular positioning range of the injection unit positioning apparatus.

In each of the previously described embodiments the angular positioning assembly and the linear positioning assembly are respectively rotated/translated by an operator engaging with a drive member, or handle, i.e., the angular positioning assembly and the linear positioning assembly are manually driven, and the elevation assembly is translated by a linear actuator by way of example and not limitation. In an alternative embodiment (not shown) the angular positioning assembly and the linear positioning assembly are driven by a motor, and the elevation assembly is manually driven.

In each of the previously described embodiments, the injection unit positioning apparatus is arranged in a vertical orientation, for example, coupled to the top of a molding machine platen, to align outlet 110 of injection unit 101 with inlet 808 that is on the top of mold 809 by way of example and not limitation. In an alternative embodiment (not shown) the injection unit positioning apparatus is arranged in a horizontal orientation, for example, coupled to a side of a molding machine platen to align outlet 110 of injection unit 101 with an inlet 808 that is on the side of a mold 809.

It will be apparent to persons skilled in the relevant art that various changes in form and detail can be made therein without departing from the scope of the invention. The scope of the claims should not be limited by the embodiments set forth in the examples, but should be given the broadest interpretation consistent with the description as a whole. It will also be understood that each feature of each embodiment discussed herein, can be used in combination with the features of any other embodiment.

What is claimed is:

1. An apparatus for aligning an outlet of an injection unit with an inlet of a mold mounted between platens of a molding machine, the apparatus comprising:
    a positioning assembly interconnecting the injection unit to the molding machine, the positioning assembly including
        an angular positioning assembly that permits rotation of the injection unit through a sweep plane, the sweep plane extending radially outward from a sweep axis, the sweep axis being substantially perpendicular to an inlet surface of the mold, and
        a linear positioning assembly that permits linear translation of the injection unit on the sweep plane along a translation axis that is substantially transverse to the sweep axis,
    wherein a height of the outlet of the injection unit relative to the inlet surface of the mold remains substantially constant during rotation of the injection unit through the sweep plane and during linear translation of the injection unit on the sweep plane.

2. The apparatus according to claim 1, wherein the positioning assembly further comprises an elevation assembly that permits adjusting the elevation of the injection unit relative to the inlet surface of the mold.

3. The apparatus according to claim 1, wherein the angular positioning assembly is coupled to the molding machine and the linear positioning assembly is coupled to the angular positioning assembly.

4. The apparatus according to claim 2, wherein the elevation assembly is coupled to the linear positioning assembly.

5. The apparatus according to claim 1, wherein the linear positioning assembly is coupled to the molding machine and the angular positioning assembly is coupled to the linear positioning assembly.

6. The apparatus according to claim 2, wherein the elevation assembly is coupled to the angular positioning assembly.

7. The apparatus according to claim 1, wherein the angular positioning assembly comprises a fixed rotary part and a movable rotary part, the movable rotary part rotatable relative to the fixed rotary part about the sweep axis.

8. The apparatus according to claim 7, wherein when the fixed rotary part is coupled to the molding machine, the linear positioning assembly is coupled to the movable rotary part and an elevation assembly is coupled to the linear positioning assembly.

9. The apparatus according to claim 7, wherein the fixed rotary part comprises a base plate coupled directly to the molding machine.

10. The apparatus according to claim 7, wherein the movable rotary part comprises a swivel pin rotatably coupled to the fixed rotary part.

11. The apparatus according to claim 7, wherein the angular positioning assembly further comprises a friction clamp for allowing continuous angular positioning of the movable rotary part relative to the fixed rotary part.

12. The apparatus according to claim 11, wherein when the friction clamp is disengaged, the movable rotary part is lifted relative to the fixed rotary part.

13. The apparatus according to claim 7, wherein the angular positioning assembly further comprises an index pin and one of the fixed rotary part and the movable rotary part further comprises at least one index hole, whereby engagement between the index pin and the index hole locks the angular positioning assembly at a discrete angular position.

14. The apparatus according to claim 1, wherein the linear positioning assembly comprises a fixed linear part and a movable linear part, the moveable linear part translatable relative to the fixed linear part along the translation axis.

15. The apparatus according to claim 14, wherein the fixed linear part is coupled to the molding machine, the angular positioning assembly is coupled to the movable linear part and an elevation assembly is coupled to the angular positioning assembly.

16. The apparatus according to claim 14, wherein the fixed linear part comprises a swivel plate.

17. The apparatus according to claim 14, wherein the movable linear part comprises a rail plate.

18. The apparatus according to claim 14, wherein the linear positioning assembly further comprises a friction clamp for allowing continuous linear positioning of the movable linear part relative to the fixed linear part.

19. The apparatus according to claim 2, wherein the elevation assembly comprises a fixed elevation part and a movable elevation part, the movable elevation part translatable relative to the fixed elevation part along an elevation axis at an angle relative to the inlet surface of the mold.

20. The apparatus according to claim 19, wherein the elevation axis is substantially parallel to the sweep axis.

21. The apparatus according to claim 19, wherein the movable elevation part is translatable relative to the fixed elevation part between an extended position and a retracted position, and the outlet of the injection unit engages with the inlet of the mold when the movable elevation part is translated to the retracted position.

22. The apparatus according to claim 1, wherein the positioning assembly is coupled to one of the platens of the molding machine.

23. The apparatus according to claim 7 further comprising an adaptor plate coupled to the molding machine, and the fixed rotary part coupled to the adaptor plate.

24. The apparatus according to claim 7, wherein the linear positioning assembly comprises a movable linear part, the moveable linear part translatable relative to the moveable rotary part along the translation axis.

* * * * *